(12) United States Patent
Nakayama et al.

(10) Patent No.: US 7,885,344 B2
(45) Date of Patent: Feb. 8, 2011

(54) WIRELESS COMMUNICATION APPARATUS

(75) Inventors: Takashi Nakayama, Chiba (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 887 days.

(21) Appl. No.: 11/724,293

(22) Filed: Mar. 15, 2007

(65) Prior Publication Data

US 2007/0223608 A1 Sep. 27, 2007

(30) Foreign Application Priority Data

Mar. 22, 2006 (JP) .......................... P2006-078773

(51) Int. Cl.
*H04K 1/10* (2006.01)
(52) U.S. Cl. .................... 375/260; 375/340; 375/346; 455/296; 455/500; 370/335; 370/342
(58) Field of Classification Search ............. 375/260, 375/340, 346; 455/296, 500; 370/335, 342
See application file for complete search history.

(56) References Cited

U.S. PATENT DOCUMENTS

| 7,184,485 | B2* | 2/2007 | Balakrishnan et al. ...... 375/260 |
| 7,567,786 | B2* | 7/2009 | Bjerede ................... 455/196.1 |
| 2002/0155811 | A1* | 10/2002 | Prismantas et al. ............ 455/63 |
| 2005/0164642 | A1 | 7/2005 | Roberts |
| 2005/0195883 | A1* | 9/2005 | Choi et al. .................. 375/130 |
| 2005/0237975 | A1* | 10/2005 | Santhoff et al. ............. 370/329 |
| 2006/0171445 | A1* | 8/2006 | Batra et al. ................. 375/130 |
| 2007/0076813 | A1* | 4/2007 | Haartsen .................... 375/285 |

FOREIGN PATENT DOCUMENTS

JP 2004-188035 7/2004
WO WO 2006/007599 1/2006

OTHER PUBLICATIONS

Tsang et al., "Ultra-wideband (UWB) communications systems: an overview", IEEE-NEWCAS Conference, 2005, The 3rd International Quebec City, Canada Jun. 19-22, 2005, pp. 124-129.
Batra, Anuj, "Project: IEEE P802.15 Working Group for Wireless Personal Area Networks (WPANs)," doc: IEEE 802-15-03/267r1, Jul. 2003.
Yamaguchi, Hirohisa, "Active Interference Cancellation Technique for MB-OFDM Cognitive Radio", Texas Instruments, Tsukuba Technology Center, 2004.
Abidi, Asad A., "Direct-Conversion Radio Transceivers for Digital Communication", IEEE Journal of Solid-State Circuits, vol. 30, No. 12, Dec. 1995.

* cited by examiner

*Primary Examiner*—David C Payne
*Assistant Examiner*—Leon Flores
(74) *Attorney, Agent, or Firm*—Finnegan, Henderson, Farabow, Garrett & Dunner, L.L.P.

(57) ABSTRACT

A wireless communication apparatus utilizing an orthogonal frequency division multiplexing communication method includes an antenna transmitting and receives a radio-frequency signal; a receiver frequency converter frequency-converting the radio-frequency signal into a baseband signal in accordance with a low-intermediate frequency method; an analog-to-digital converter converting the baseband signal into a digital signal; an orthogonal frequency division multiplexing demodulator acquiring a plurality of subcarriers in a frequency domain; a data reproduction unit reproducing data; a transmission data generator generating transmission data; an orthogonal frequency division multiplexing modulator performing orthogonal frequency division multiplexing modulation of the plurality of subcarriers; a digital-to-analog converter converting the digital orthogonal frequency division multiplexing signal into an analog signal; and a transmitter frequency converter converting the analog transmission baseband signal into a transmission radio-frequency signal in accordance with a zero-intermediate frequency method.

16 Claims, 17 Drawing Sheets

STEP 1

DATA IS BEING
TRANSMITTED
IN SUBBAND 2

STEP 2

DETECT PRESENCE OF
DIFFERENT NARROW-BAND
SYSTEM IN SUBBAND 2

STEP 3

PROVIDE NOTCH FILTER FOR
WHICH CENTER FREQUENCY AND
BANDWIDTH ARE SELECTED IN
ACCORDANCE WITH NARROW-BAND
SIGNAL TO AVOID INTERFERENCE
TO NARROW-BAND SYSTEM

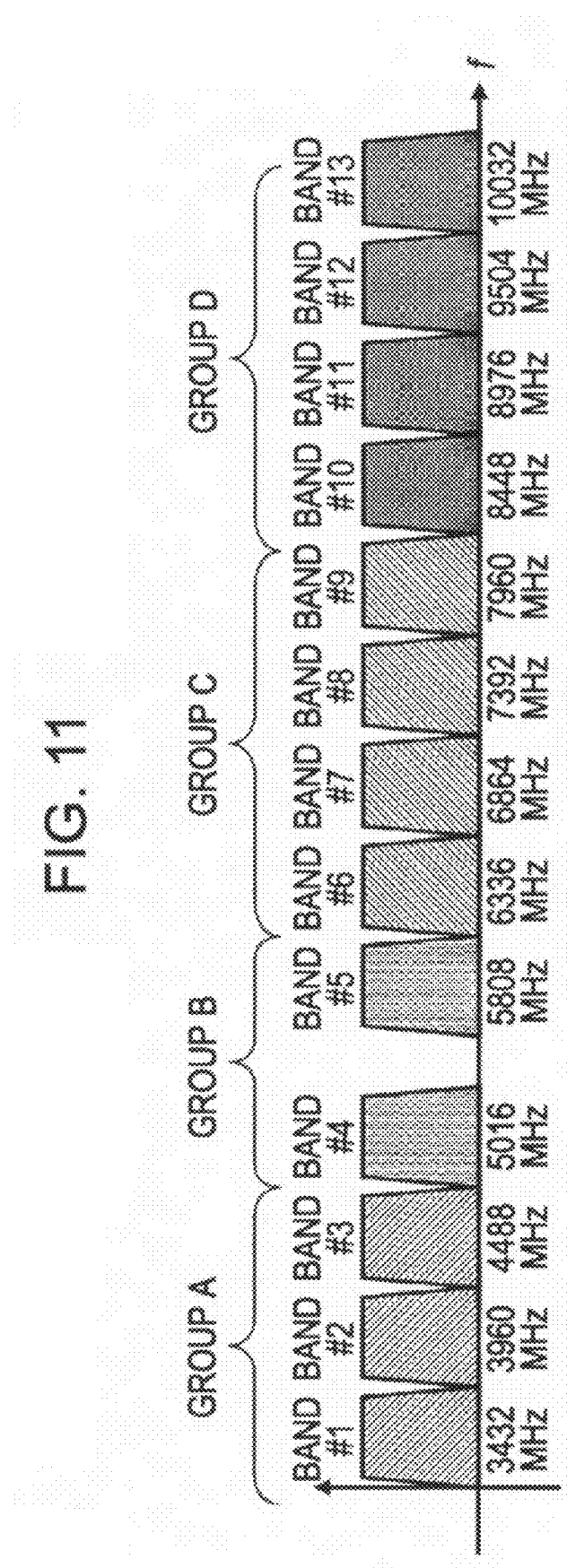

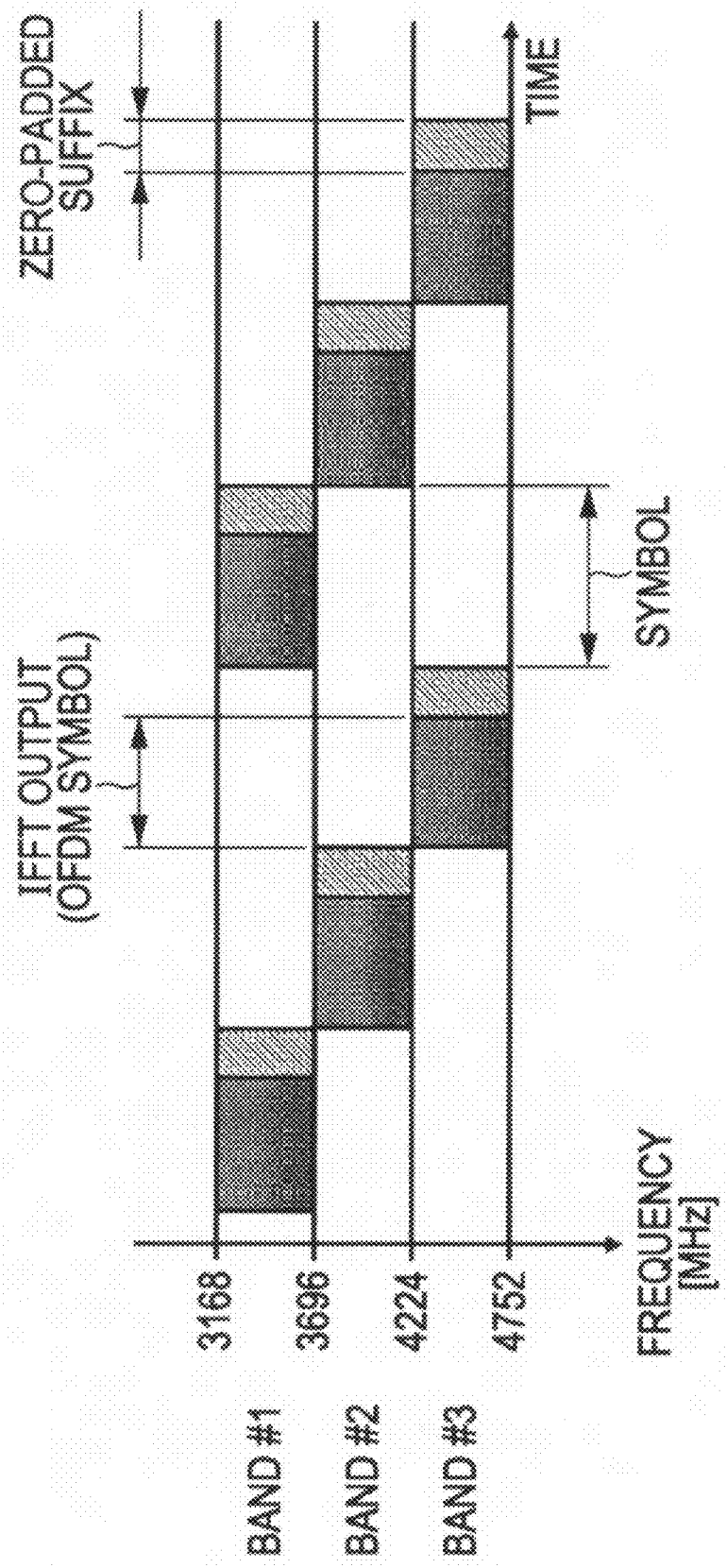

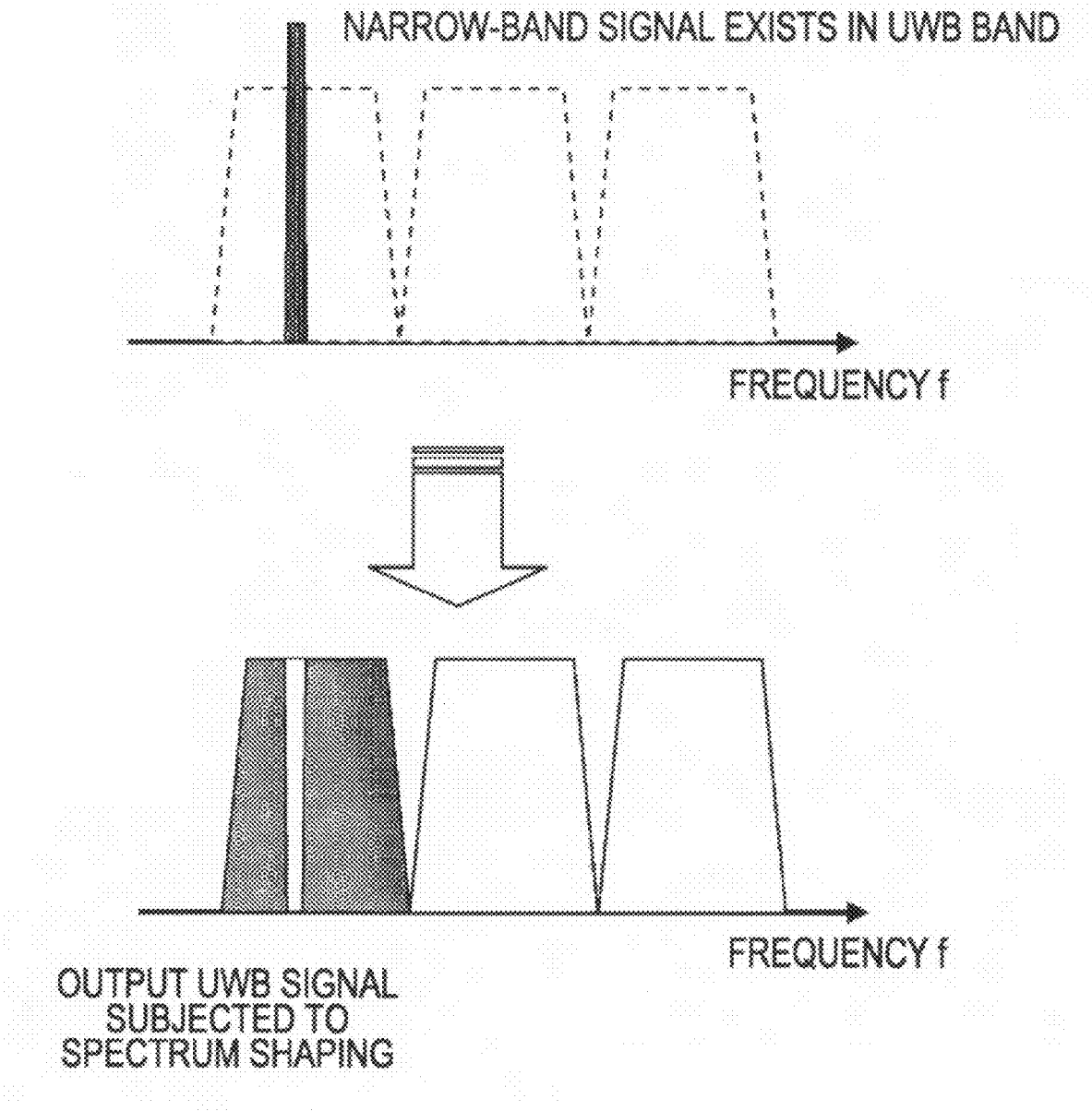

WIRELESS COMMUNICATION APPARATUS

CROSS REFERENCES TO RELATED APPLICATIONS

The present invention contains subject matter related to Japanese Patent Application JP 2006-078773 filed in the Japanese Patent Office on Mar. 22, 2006, the entire contents of which are incorporated herein by reference.

BACKGROUND OF THE INVENTION

1. Field of the Invention

The present invention relates to wireless communication apparatuses that adopt an orthogonal frequency division multiplexing (OFDM) modulation method and that perform ultra-wideband (UWB) communications in which transmission signals are spread over a wide band, and more particularly, to a multiband OFDM (MB-OFDM) wireless communication apparatus that performs UWB communications while performing frequency hopping (FP) for each OFDM symbol.

More specifically, the present invention relates to wireless communication apparatuses that perform MB-OFDM communications while avoiding, in consideration of frequency use efficiency, interference with existing communication systems that use narrow-band signals, and more particularly, to an MB-OFDM wireless communication apparatus that avoids such interference by setting an actual noise floor at an antenna terminal, not a baseband output, to a specified level or less.

2. Description of the Related Art

Recently, a wireless communication method called "ultra-wideband (UWB) communications", which is capable of high-speed transmission of 100 Mbps or faster utilizing a very wide frequency band, has drawn attention. For example, in the United States, a UWB spectrum mask is defined by the Federal Communications Commission (FCC), and UWB transmission in the 3.1 GHz to 10.6 GHz frequency band is permitted for indoor communications. UWB communications adopts a wireless communication method for short-distance communication due to low transmission power, and is capable of high-speed wireless transmission. Thus, a personal area network (PAN) having a communication range of about 10 meters is assumed for UWB communications. Therefore, practical use of UWB communications as a wireless communication system implementing short-distance ultra-high-speed transmission has been expected.

In addition, as a technology for avoiding deterioration in transmission quality due to fading of wireless signals and for achieving higher-speed and higher-quality wireless transmission, an OFDM transmission method has been expected. In a conference for the standardization of IEEE 802.15.3a, a direct sequence spread spectrum (DSSS)-UWB method in which the spreading speed of direct-spread (DS) information signals is maximized and an OFDM-UWB method in which an OFDM modulation method is adopted were defined as UWB transmission methods. Trial production employing such methods has been conducted.

In addition, an FH method in which a used frequency band is flexibly changed has been known. In the FH method, packets are transmitted and received while the frequency is changed at random. Although communication may be interrupted due to the influence of a different system, communication is hardly ever interrupted since the frequency is continuously changed. That is, according to the FH method, coexistence with a different system can be achieved, an excellent fading resistance can be realized, and the scalability can be easily enhanced.

In the IEEE 802.15.3 standardization conference, for each of the DSSS-UWB method and the OFDM-UWB method, a multiband method (hereinafter, referred to as an "MB-OFDM method") in which the 3.1 GHz to 10.6 GHz frequency band defined by the FCC is divided into a plurality of subbands each having a width of 528 MHz and frequency hopping is performed between the subbands is discussed.

FIG. 11 shows an example of frequency allocation defined by an MB-OFDM communication method (see, for example, "MBOFDM PHY Specification Final Release 1.0", WiMedia Alliance, Apr. 27, 2005). In the example shown in FIG. 11, a frequency band of 5 GHz used for a wireless local-area network (LAN) is defined as a null band, and the remaining frequency band is divided into thirteen subbands. The subbands are grouped into four groups, groups A to D, and frequency is controlled for each group so that communication can be performed. The group A is a mandatory band group defined in the standard specification.

FIG. 12 shows a state in which data is transmitted while frequency hopping is performed with respect to an OFDM symbol in the time axis in the MB-OFDM method. In the example shown in FIG. 12, the group A constituted by bands #1 to #3 shown in FIG. 11 is used, frequency hopping is performed while the center frequency is changed for each OFDM symbol, and OFDM modulation adopting inverse fast Fourier transform/fast Fourier transform (IFFT/FFT) formed by 128 points is performed.

In the wireless communication environment in which a plurality of communication systems coexists, a transmission signal of one communication system may act as an interfering wave for the other systems. In particular, for UWB communications, since transmission signals are spread over wideband frequencies, the influence of interference on existing communication systems (for example, fixed microwaves, broadcast waves, radio astronomical waves, and the like) on the same frequency band that is allocated for the UWB communications has been of concern. Thus, implementation of an interference avoidance technology in which a UWB transmission wave is emitted at a specified level or less (that is, at a very weak level) in a band in which an existing communication system exists, that is, implementation of a detect and avoid (hereinafter, referred to as DAA) technology has been regarded as being necessary.

Recently, in preparation for implementation of PANs using the UWB communication system, an active international controversy as to mitigation of the level of interference to other systems, which is caused by UWB transmission waves, has arisen. In the International Telecommunications Union-Radiocommunication Sector (ITU-R), the FCC, the European Communications Commission (ECC), and the like, legislation has been discussed. For example, in the FCC, a wireless equipment rule regarding the UWB communication system has already been decided.

In Japan, the Ministry of Internal Affairs and Communications is preparing legislation for early implementation of the UWB communication system. In a workshop session held in Aug. 25, 2005, a working group of a UWB wireless system commission in the Ministry of Internal Affairs and Communications released a provisional mask scheme about spectrum emission relating to domestic UWB transmission output regulations and comments on the implementation of interference avoidance technology. According to the release, with respect to a transmission output value permitted in the 3.4 GHz to 4.8 GHz band and the 7.25 GHz to 10.25 GHz band, if interference avoidance (DAA) technology in which the effectiveness for the fourth-generation mobile communication and broadcasting (field pickup unit (FPU)) is verified is established, for an apparatus having DAA technology, the interference level is mitigated to −41.3 dBm/MHz (the same as the frequency output regulations defined by the FCC). For apparatuses not having DAA technology, the interference level must be −70 dBm/MHz or less. In addition, discussion will be directed to the issue concerning the use of UWB being limited to indoor communications.

In a basic DAA method, the presence of a transmission signal of a different system in a UWB transmission band is examined. If a transmission signal of a different system exists in the UWB transmission band, a UWB transmission wave is emitted at a specified level or less (that is, at a very weak level). However, since a signal output from an existing communication system is a narrow-band signal, only part of the band used by the UWB communication system has an influence, if the UWB emission level is reduced to the specified level or less throughout the band by detecting the signal output from the different system, satisfactory frequency use efficiency is not achieved. Thus, it is considered that, in terms of frequency use efficiency, selectively reducing the UWB emission level to the specified level or less only in a frequency band region in which a signal of a different system is detected is desirable as a high-speed communication method.

For example, when a narrow-band carrier within a UWB band is detected, a notch is provided only in a frequency band region in which a transmission signal of a different system is detected (see FIG. 13). Thus, UWB communication using frequency band regions other than the frequency band region in which the transmission signal of the different system is detected is available while interference with the different system is avoided.

However, it is difficult for a transceiver adopting the UWB communication system corresponding to the known FCC wireless equipment rule to have the DAA function.

In a DSSS-UWB transceiver, when the presence of a different narrow-band wireless system in a used frequency band is detected, if, in order to avoid interference, a notch is provided only in a band region in which the different narrow-band wireless system is detected, a transmission waveform is distorted, resulting in failure to perform communication as a system.

In contrast, in an MB-OFDM-UWB transceiver, the FFT has a frequency detection operation. Thus, by executing analog-to-digital (A/D) conversion and FFT on a reception signal, a frequency band region in which an interfering wave exists can be examined for each subcarrier (see, for example, Japanese Unexamined Patent Application Publication No. 2004-188035, Paragraphs 0018 to 0019). If spectrum shaping is performed on a transmission signal and a notch is provided only in a subcarrier in a frequency band region in which a transmission signal of a different system is detected, it is possible to perform UWB communication using frequency band regions other than the frequency band region in which the transmission signal of the different system is detected while avoiding interference (see, for example, http://wimedia.org/en/index.asp). For example, with an active interference cancellation (AIC) technology, a saturation problem of a notch level due to interference of each subcarrier of an OFDM signal can be solved, and a notch level of 30 dB or more can be achieved (see, for example, Hirohisa Yamaguchi, "Active Interference Cancellation Technique for MB-OFDM Cognitive Radio").

For a baseband output, the above-described methods can be realized. However, in order to actually reduce the noise floor level of an antenna terminal to −70 dBM/MHz or less, a problem in a radio frequency (RF) circuit module is more crucial. This problem will be considered for a receiver and a transmitter, individually.

FIG. 14 shows an example of a configuration of a receiver used in an MB-OFDM system (see, for example, Anuj Batra, "03267r1P802-15_TG3a-Multi-band-OFDM-CFP-Presentation.ppt", pp.17, July 2003). The receiver shown in FIG. 14 adopts a Zero-IF configuration. In the Zero-IF method, an intermediate frequency (IF) stage is deleted. After amplifying a signal received by an antenna, the receiver performs direct frequency conversion on a baseband signal by multiplying the amplified signal by a local frequency $f_{LO}$. In the example shown in FIG. 14, local (LO) signals $\cos(2\pi f_{LO})$ and $\sin(2\pi f_{LO})$ having a frequency the same as the center frequency of an RF signal are used for frequency conversion of a reception signal in an I-axis and a Q-axis. After the frequency conversion is executed, a lower frequency band is extracted through a low-pass filter (LPF), amplification is performed by a variable gain amplifier (VGA), and A/D conversion is performed. Then, a signal in a time axis is converted into a signal in a frequency axis by FFT, demodulation is performed on each carrier, and information sent as an original serial signal is reproduced. In the Zero-IF receiver, for example, when the bands of the group A shown in FIG. 11 are used, three frequencies, 3432 MHz, 3960 MHz, and 4488 MHz, which are the same as the center frequencies of RF signals, are used as local signals LO.

In the Zero-IF method, since no IF filter is used, a receiver having a wider bandwidth can be easily achieved, thus increasing the flexibility of the configuration of the receiver. On the contrary, since a reception frequency is the same as a local frequency, due to the local signal itself, a DC component, that is, a DC offset, is generated in a down-converter output (see, for example, Asad A. Abidi, "Direct-Conversion Radio Transceivers for Digital Communications" (IEEEJ. Solid-State Circuits, vol. 30, no. 12, pp. 1399-1410, 1995). Here, the position of a baseband signal of 0 Hz in the OFDM modulation method is referred to as "DC".

Self-mixing of a local signal is generated, as shown in FIG. 15, when part of the local signal leaked from the receiver main unit toward the antenna is reflected at the antenna and returned to the receiver main unit and the returned part is multiplied by the local signal in a mixer. Alternatively, after part of the local signal is emitted toward the outside through the antenna, a reflected wave may be received at the antenna and mixed with the local signal. For example, the amplitude of the local signal is 0.5 V, the total gain of a low-noise amplifier (LNA) and the mixer is 30 dB, and −70 dB attenuation is achieved from reflection of the leakage of the local signal at the antenna to return to a point A shown in FIG. 15. In this case, the DC offset of an output of the mixer is 2.5 mV. In contrast, since the signal level of a desired wave is at least about −74 dBm, an output of the mixer exhibits −44 dBm=1.4 mVrms. Accordingly, the DC offset is greater than the signal level of the desired wave.

In the MB-OFDM-UWB system, since frequency hopping is performed for each OFDM symbol (see FIG. 12 and the above descriptions), the frequency of the local signal changes for each frequency hopping operation. In such a wide band, the reflection coefficient of the antenna is different according to the frequency of a local signal. Thus, the DC offset in the down-converter output generated by self-mixing changes in accordance with frequency hopping.

The frequency of frequency hopping is 3.2 MHz, which is the same as the symbol rate. Thus, the DC offset is changed in steps at a period of 1/3.2 MHz=312.5 nanoseconds, as shown in FIG. 16. When DC offset components, which are generated in steps, are viewed in terms of a frequency range after execution of FFT, interference occurs with respect to a baseband desired signal, as shown in FIG. 17.

In a normal receiver configuration, a VGA is disposed downstream of a down-converter output, and the gain of the VGA is controlled from a baseband signal processor side such that a reception signal has an optimal dynamic range (that is, maintains a target level) in an A/D converter, which is disposed in the downstream. Since a very large gain is obtained in the VGA, even if a DC offset component generated in the down-converter output is very small, a very large DC offset component is obtained as a VGA output. For example, if an RF circuit module is designed and produced as an RF complementary metal-oxide semiconductor (CMOS) circuit based on a wiring rule of 0.13 micrometers, the power-supply voltage is 1.2 V. Thus, in a circuit configuration in which MOS transistors are stacked vertically, a large DC offset component collapses the drain-source voltage $V_{ds}$. Thus, a desired characteristic is not achieved.

In order to delete a DC offset and solve the above-described problems, generally, capacitors are inserted in series between stages of mixer outputs (see FIG. 18). In this case, a capacitor C and a circuit impedance R constitute a first-order high-pass filter (HPF). The cut-off frequency of a frequency response is $1/(2\pi CR)$, and the convergence time of a step response is $2\pi CR$.

However, inserting the HPF prevents a baseband unit of the receiver from obtaining information on a frequency in the vicinity of the local frequency of the receiver. Thus, in the vicinity of the local frequency band, a signal from a different system is not detected. That is, DAA is not achieved.

In addition, in a normal UWB transmitter, a double-balanced mixer is used as an orthogonal modulator (MOD). If a mixer of this type performs an ideal operation, a differential signal is cancelled out between RF and baseband and between LO and RF. Thus, feed through does not exist. However, in the actual IC, due to asymmetry caused by relative variation of elements and no execution of ideal square-wave switching, feed through exists between RF and baseband and between LO and RF. Thus, a carrier leakage is generated in an MOD output.

Generation of a carrier leakage in an MOD output will be described with reference to FIGS. 19A to 19C and FIG. 20. Orthogonal modulation uses local signals having a phase difference of 90 degrees. The local signals of the phase difference of 90 degrees are multiplied with an I-axis signal having the same phase channel and a Q-axis signal being orthogonal to the I-axis signal. This multiplication circuit ideally operates so as to suppress the local signals. Actually, however, a carrier leakage is generated due to feed through caused by imbalance of circuit elements. In addition, when deviation of DC bias exists in the I-axis and the Q-axis, since the multiplication circuit does not suppress the local signals, a carrier leakage is also generated.

A local signal can be mathematically expressed as a Fourier series represented by equation (1). Here, the conversion gain of MOD_MIX is assumed as being 0 dB. In addition, the operation of the double-balanced MOD_MIX is regarded as being ideal square-wave switching.

$$LO(t) = \frac{1}{2} - \frac{2}{\pi}\sum_{n=1}^{\infty}(-1)^n \cdot \frac{\cos(2n-1)\omega_{LO}t}{2n-1} \quad (1)$$

A bias component of a signal I of I and Q differential signals and a bias component of an inversion signal IX (or a signal Q and an inversion signal QX) are represented by $A_1$ and $A_2$, respectively. Since an inversion signal LOX of a local signal is represented by 1-LO(t), a signal component of a double-balanced MOD_MIX output is represented by equation (2).

$$S_{out}(t) = S_{in\_p}(t)[\overline{LO}(t) - LO(t)] - S_{in\_n}(t)[\overline{LO}(t) - LO(t)] \quad (2)$$
$$= \frac{4}{\pi}(A_1 - A_2)\cos\omega_{LO}(t) + \frac{2}{\pi}S_1 \cdot$$
$$[\cos(\omega_{LO} - \omega_{IN})t + \cos(\omega_{LO} + \omega_{IN})t] + \ldots$$

That is, if the bias component $A_1$ of the signal I of the I and Q differential signals is different from the bias component $A_2$ of the inversion signal IX, feed through of the local signal occurs. If it is assumed that the conversion gain of MOD_MIX is 0 dB as described above, calculation based on the assumption shows that a carrier leakage of −67 dBm is generated at MOD_MIX output even if the difference in the bias component of the I signal and the bias component of the IX signal is 0.1 mV.

WiMedia Alliance has decided upon the use of the UWB wireless system for a physical layer of a wireless universal serial bus (USB). In this case, in terms of the cost of a UWB device, it is difficult to adjust bias components of the I and IX signals to 0.1 mV or less in a production line for each USB device.

As described above, in the receiver, since a dead band region in which no signal is detected is generated in the vicinity of a local frequency of the receiver, DAA is not achieved. Thus, in accordance with the provisional mask scheme described above released by the Ministry of Internal Affairs and Communications, it is necessary to reduce the output level of a transmission signal to −70 dBm/MHz or less. In the transmitter, since a carrier leakage is generated by feed through of a local signal caused by an error in the amplitudes and phases of I and Q differential signals, it is very difficult to satisfy the above-mentioned requirement.

In addition, in order to solve the problem relating to the DC offset in the receiver having the Zero-IF configuration, a receiver having a Low-IF configuration using a lower IF is known. In general, unification of architectures of a transmitter and a receiver is basic to the design of communication apparatuses. However, in a transmitter having the Low-IF configuration, there is a problem of an image spurious component caused by IQ imbalance when orthogonal modulation is performed (an image spurious component in an orthogonal modulator is generated only in the Low-IF configuration, and an image spurious component is not generated in the Zero-IF configuration). If a detection signal exists above a local frequency, as shown in FIG. 21A, since an image frequency is generated below the local frequency, it is necessary not only to avoid an upper subband but also to avoid the image frequency in a subcarrier.

For example, if there is a gain error of 5% between an I-axis signal and a Q-axis signal, an image rejection of −32 dBc is achieved, as represented by equation (3).

$$\text{Image rejection} = 20\log(2.5/100) = -32.0[\text{dBc}] \quad (3)$$

In addition, if there is a phase error of 5 degrees between the I-axis signal and the Q-axis signal, an image rejection of −27.2 dBc is achieved, as represented by equation (4).

$$\text{Image rejection} = 20\log(\tan(\pi \cdot 2.5/180)) = -27.2[\text{dBc}] \quad (4)$$

In addition, if there is a gain error of 5% and a phase error of 5 degrees between the I-axis signal and the Q-axis signal, an image rejection of −21.7 dBc is achieved, as represented by equation (5).

$$\left| \begin{array}{l} \text{Image rejection} = 10\log((2.5/100)^2 + \tan(\pi \cdot 2.5/180)^2) \\ \phantom{\text{Image rejection}} = -21.7[\text{dB}c] \end{array} \right. \quad (5)$$

As described above, due to a spurious image component caused by IQ imbalance when orthogonal modulation is performed, two types of interference avoidance technology, subband avoidance and subcarrier avoidance, are necessary at the same time. Thus, there is an increase in the burden regarding the adoption of countermeasures for DAA in a baseband unit.

SUMMARY OF THE INVENTION

It is desirable to provide an excellent MB-OFDM wireless communication apparatus that is capable of suitably performing UWB communication while performing frequency hopping for each OFDM symbol.

It is also desirable to provide an excellent wireless communication apparatus that is capable of suitably performing MB-OFDM communication while avoiding interference with an existing communication system that uses a narrow-band signal taking into consideration frequency use efficiency.

It is also desirable to provide an excellent wireless communication apparatus that is capable of avoiding interference by setting an actual noise floor at an antenna terminal, not a baseband output, to a specified level or less.

A wireless communication apparatus according to an embodiment of the present invention utilizing an orthogonal frequency division multiplexing communication method includes an antenna that transmits and receives a radio-frequency signal; a receiver frequency converter that frequency-converts the received radio-frequency signal into a baseband signal in accordance with a low-intermediate frequency method using a local signal obtained by adding a low intermediate frequency to a center frequency of the radio-frequency signal; an analog-to-digital converter that converts the baseband signal into a digital signal; an orthogonal frequency division multiplexing demodulator that acquires a plurality of subcarriers in a frequency domain by performing orthogonal frequency division multiplexing demodulation of the digitized signal; a data reproduction unit that reproduces data from each of the plurality of subcarriers after the orthogonal frequency division multiplexing demodulation is performed; a transmission data generator that generates transmission data by allocating to the plurality of subcarriers data that is requested from an upper layer to be transmitted; an orthogonal frequency division multiplexing modulator that performs orthogonal frequency division multiplexing modulation of the plurality of subcarriers in the frequency domain; a digital-to-analog converter that converts the digital orthogonal frequency division multiplexing signal into an analog signal at a resolution with a signal-to-noise ratio of a predetermined value or less; and a transmitter frequency converter that converts the analog transmission baseband signal into a transmission radio-frequency signal in accordance with a zero-intermediate frequency method using a local signal having a frequency the same as the frequency of the radio-frequency signal.

UWB communication using a very wide frequency band has been expected as a wireless communication system that implements short-distance ultra-high-speed transmission, and standardization has been performed. In order to mitigate the level of interference to a different system caused by UWB transmission waves, a detect and avoid (DAA) mechanism is necessary in which the presence of a transmission signal from the different system in a UWB transmission band is examined and a UWB transmission wave is emitted at a specified level or less if a transmission signal from the different signal exists.

In a UWB transmitter utilizing an MB-OFDM method in which frequency hopping is performed, by examining a frequency band region in which an interfering wave exists for each subcarrier in accordance with a frequency detection operation provided in FFT and by providing a notch in a subcarrier of a frequency band region in which interference with a different system may occur in accordance with AIC technology, UWB communication can be performed using frequency band regions other than the frequency band region in which the interference with the different system may occur. For a baseband output, the above-described methods can be realized. However, a problem in an RF circuit module is more crucial.

Due to an HPF inserted in order to remove a DC offset component generated in a down-converter output, a receiver generates a band region in which frequency information is not obtained. If the communication apparatus adopts the Zero-IF method, such a dead band region is located in the vicinity of a local frequency of the receiver. Thus, it is difficult to perform detection processing of a DAA operation. Thus, although it is necessary to reduce the output level of a transmission signal to −70 dBm/MHz or less in accordance with the provisional mask scheme described above released by the Ministry of Internal Affairs and Communications, it is very difficult to satisfy the above-mentioned requirement because of the problem of a carrier leakage.

In contrast, in the wireless communication apparatus according to an embodiment of the present invention, on the basis of a UWB transceiver configuration utilizing the MB-OFDM method, the transmitter architecture is based on the Zero-IF method and the receiver architecture is based on the Low-IF method.

When the receiver has the Low-IF configuration and an IF of 264 MHz, which is half the subband width, is used, an interference component with respect to a desired signal is located in a band region obtained by adding the IF of 264 MHz to the local frequency, that is, near an end of a subband. Thus, no dead band region is generated within the subband.

Since Low-IF means Near Zero-IF, that is, a reduced IF, the IF is not necessarily limited to 264 MHz, which is half the bandwidth. For example, in a communication system using only a single band in which frequency hopping is not performed, when an IF of equal to or more than half the bandwidth is set, a dead band region is disposed outside the used band. Thus, detection processing of the DAA operation can be attained.

Unlike the receiver, the transmitter adopts the Zero-IF configuration. Since the receiver is capable of detecting the presence of a different system in each subband, if the ratio of signal to noise is reduced in each band region in the vicinity of a boundary between subbands serving as a dead band region, DAA technology, which is proposed by the Ministry of Internal Affairs and Communications, can be satisfactorily used. More specifically, when a D/A converter in an analog front-end unit of the transmitter has a resolution of 6 bits, the noise floor level at an antenna terminal can be reduced to −70 dBm/MHz or less.

When the transmitter adopts the Zero-IF method, it is necessary to use a frequency of 264 MHz, which corresponds to half the subband width, in a multiband generator. Thus, if a third-harmonic wave or a fifth harmonic wave is generated, a spurious component is generated within the band of the corresponding band group. In order to solve this problem, by using a digital sine wave for a signal of 264 MHz when a local signal for transmission is generated, the third harmonic wave or the fifth harmonic wave can be canceled out and only a fundamental component can be extracted. Thus, a spurious component is not generated within the band of the mandatory band group A defined by the standardized specifications for the MB-OFDM-UWB transceiver. Thus, the noise floor level at the antenna terminal can be reduced to −70 dBm/MHz or less.

In addition, since the Zero-IF method is adopted as an up-converter in the transmitter, an image spurious component generated caused by an error in the amplitude and phase of I and Q signals when orthogonal modulation is performed, which is a problem occurring in the Low-IF method, is not generated. Thus, avoidance processing for each subband and avoidance processing for each subcarrier of the DAA operation are not necessarily performed at the same time. Therefore, a burden regarding the adoption of countermeasures for DAA in the baseband unit is decreased.

In the wireless communication apparatus according to an embodiment of the present invention, if the UWB receiver detects the presence of a different system that is performing communication in a frequency band region not in the vicinity of a local signal of the receiver, the UWB transmitter performs subband avoidance or subcarrier avoidance. Thus, the noise floor level at the antenna terminal can be reduced to −70 dBm/MHz or less.

In addition, in the wireless communication apparatus according to an embodiment of the present invention, if the UWB receiver detects a different system that is performing communication in a frequency band region in the vicinity of the local signal of the receiver, the UWB transmitter performs subband avoidance. Thus, the noise floor level at the antenna terminal can be reduced to −70 dBm/MHz or less.

In addition, in the wireless communication apparatus according to an embodiment of the present invention, since a bandpass filter that performs band limiting is arranged upstream of the antenna terminal so as not to generate a spurious component outside the band of a mandatory band group defined by the standardized specifications for the MB-OFDM-UWB transceiver. Thus, the noise floor level at the antenna terminal can be reduced to −70 dBm/MHz or less.

Accordingly, an excellent wireless communication apparatus that suitably performs MB-OFDM communications while avoiding, in consideration of frequency use efficiency, interference with an existing communication system that uses a narrow-band signal can be provided.

In addition, an excellent wireless communication apparatus that is capable of avoiding interference by setting an actual noise floor at an antenna terminal, not a baseband output, to a specified level or less can be provided.

In the MB-OFDM wireless communication apparatus according to an embodiment of the present invention, since the Low-IF method is adopted as an up-converter of the receiver, no dead band region is generated near a local frequency of the receiver. Thus, detection processing of the DAA operation can be suitably achieved.

In addition, in the wireless communication apparatus according to an embodiment of the present invention utilizing the MB-OFDM method, since the Zero-IF method is adopted as an up-converter of the transmitter, an image spurious component caused by an error in the amplitude and phase of I and Q signals when orthogonal modulation is performed, which is a problem occurring in the Low-IF method, is not generated.

Thus, avoidance processing for each subband and avoidance processing for each subcarrier of the DAA operation are not necessarily performed at the same time. Therefore, a burden regarding the adoption of countermeasures for DAA in the baseband unit is decreased.

Further objects, features, and advantages of the present invention will be apparent from the following descriptions of the embodiments of the present invention and the attached drawings.

BRIEF DESCRIPTION OF THE DRAWINGS

FIG. 11 shows an example of frequency allocation defined by an MB-OFDM communication system;

FIG. 12 shows a state in which data transmission is performed while frequency hopping is performed for an OFDM symbol in a time axis in the MB-OFDM method;

FIG. 13 shows a sate in which a notch is provided in a frequency band region in which a narrow-band signal is detected in an OFDM symbol;

DESCRIPTION OF THE PREFERRED EMBODIMENTS

The present invention relates to a wireless communication apparatus that performs UWB communication in which an OFDM modulation method is adopted. More specifically, MB-OFDM communication in which the 3.1 GHz to 10.6 GHz frequency band defined by the FCC is divided into a plurality of subbands each having 528-MHz width and frequency hopping is performed between the subbands is performed. In addition, the DAA mechanism is implemented in the wireless communication apparatus according to an embodiment of the present invention in order to mitigate the level of interference to a different system caused by UWB transmission waves. The wireless communication apparatus examines whether a transmission signal from the different system exists in a UWB transmission band, and starts data transmission while avoiding the interference. Embodiments of the present invention will be described with reference to the drawings.

Figure 1:
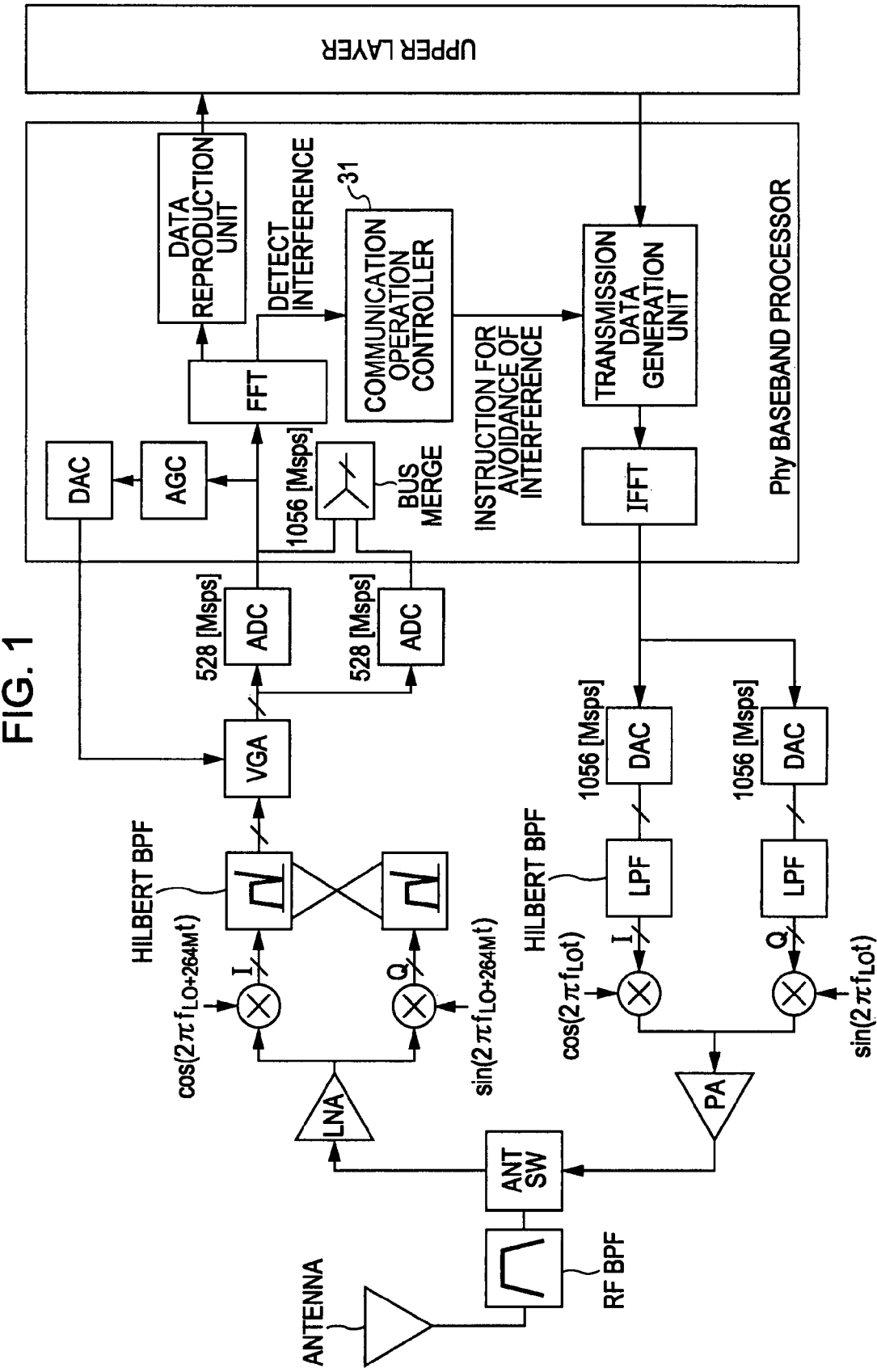
FIG. 1 shows a configuration of an MB-OFDM transceiver according to an embodiment of the present invention.

FIG. 1 shows a configuration of an MB-OFDM transceiver according to an embodiment of the present invention. An upper portion of the drawing corresponds to a receiver and a lower portion of the drawing corresponds to a transmitter. The receiver and the transmitter use a common antenna through an antenna switch (ANT SW). The receiver architecture is defined by a Low-IF configuration, and the transmitter architecture is defined by a Zero-IF configuration.

The receiver having the Low-IF configuration is known as being capable of solving a DC offset problem occurring in a receiver having the Zero-IF configuration. A Low-IF method is described, for example, in J. Crols and M. Steyaert, "Low-IF Topologies for High-Performance Analog Front Ends of Fully Integrated Receivers" (IEEE Trans. Circuits Syst. II, vol. 45, pp. 269-282, March 1998).

A receiver system utilizing the Low-IF method frequency-converts a reception signal into an IF signal by performing down conversion using complex local signal frequencies $\cos(2 f_{LO+256\,MHz} t)$ and $\sin(2 f_{LO+256}\,MHz\,t)$ obtained by adding a low intermediate frequency (IF), which is supplied from a frequency generator (not shown), of 264 MHz corresponding half the bandwidth in frequency hopping to a reception frequency.

When frequency conversion is performed, a desired signal and an image signal appear in the IF on both sides of a local frequency $f_{LO+256}$ MHz. The image signal is removed by using a Hilbert bandpass filter (BPF) as an IF filter.

Then, a variable gain amplifier (VGA) amplifies the IF signal, and A/D conversion is performed on the amplified IF signal. In order not to generate frequency folding (or aliasing in an A/D converter), it is necessary that a sampling frequency for A/D conversion is twice the signal frequency. In the Low-IF receiver having an IF of −264 MHz, a signal frequency range is −528 MHz to 0 MHz. Thus, a sampling frequency of 1056 MHz is necessary. However, in this case, A/D conversion is performed at 528 MHz (that is, the bandwidth of the center frequency in frequency hopping), which is half of 1056 MHz, and the frequency folding is positively utilized (see, for example, the specification of Japanese Patent Application No. 2004-309148, which has already been assigned to the present applicant).

In a Phy baseband processor, the A/D converted digital signal is transformed into a signal in the frequency domain by FFT. Then, a data reproduction unit modulates the phase and amplitude of each of a plurality of subcarriers, and decodes a signal point in a topological space into an original signal system. Then, the original signal system is passed to an upper layer.

When data is transmitted, a transmission data generation unit in the Phy baseband processor encodes transmission data requested from the upper layer, and allocates the encoded transmission data to a plurality of subcarriers to modulate the phase and amplitude of each of the plurality of subcarriers. Then, inverse Fourier transform is performed on the plurality of subcarriers by IFFT to obtain a time-axis signal while the orthogonality of each of the subcarriers is maintained.

Then, the OFDM modulation signal is D/A converted at a sampling rate of 1056 Msps, and only a signal component in a desired band is extracted through a low-pass filter (LPF). Then, an analog baseband signal is up-converted into a wireless signal by multiplying the extracted signal component with a local frequency $f_{LO}$ obtained by removing an intermediate frequency (IF) stage in accordance with the Zero-IF method. The wireless signal is amplified to a desired transmission power level by a power amplifier (PA), and output from and antenna through the antenna switch and an RF bandpass filter to a transmission channel. Since the RF bandpass filter that performs band limiting is arranged upstream of the antenna terminal, the MB-OFDM UWB transmitter does not generate a spurious component outside the band of a mandatory band group defined by the standardized specifications.

A communication operation controller 31 performs determination processing of a DAA operation by using a frequency detection operation provided in the FFT. That is, the presence of a narrow-band signal serving as an interfering wave is detected, for each subcarrier, from the OFDM-demodulated signal. In accordance with the detection result, an instruction for execution of an interference avoidance operation for each subcarrier or for each subband is given to the transmission system. Execution of subcarrier avoidance is attained by providing a notch in a frequency band region of an unwanted subcarrier using AIC technology. In addition, execution of subband avoidance is attained by not performing frequency hopping in a subband in which interference may occur.

The mechanisms of subband avoidance and subcarrier avoidance will be briefly explained next.

Figure 9A:
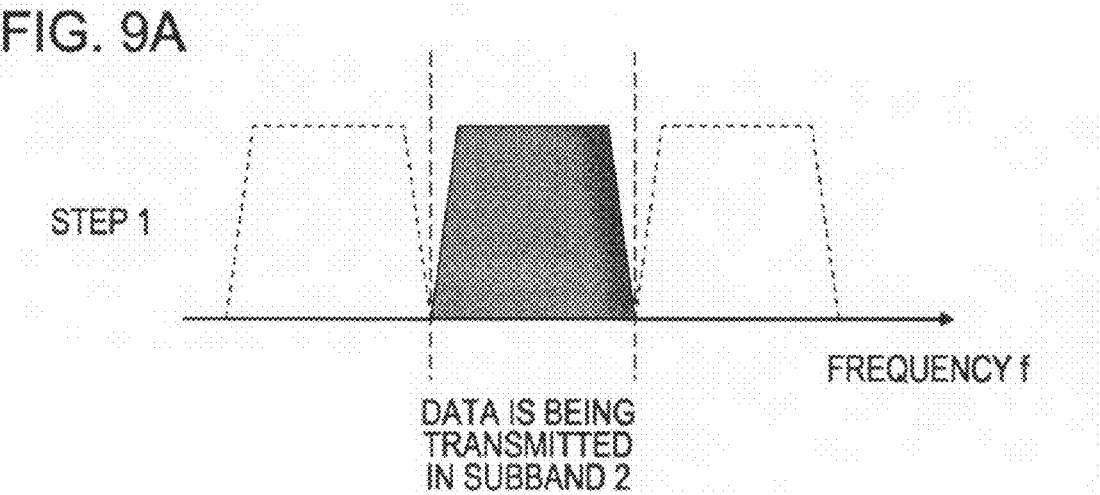
FIGS. 9A to 9C schematically show a communication operation of subband avoidance.
Figure 9B:
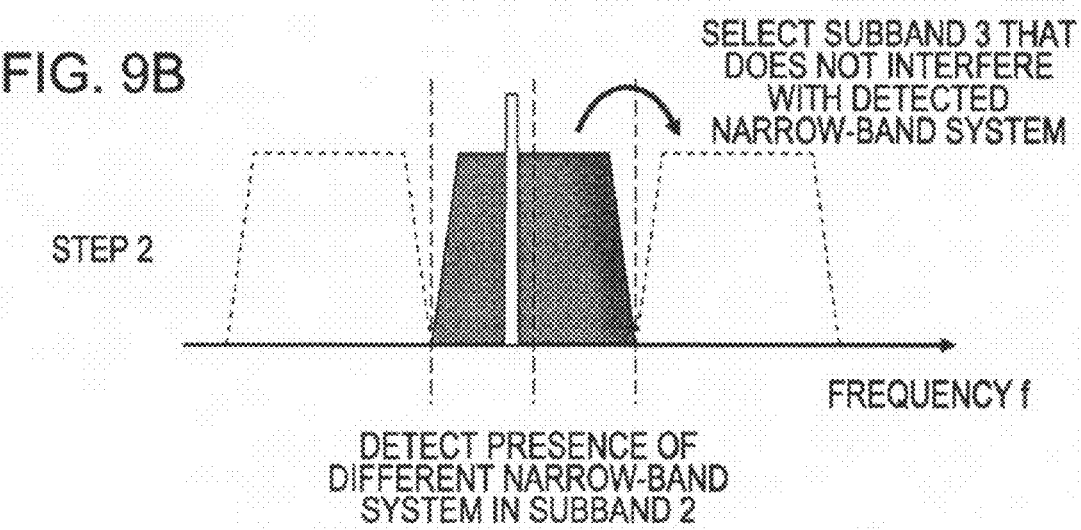
Figure 9C:
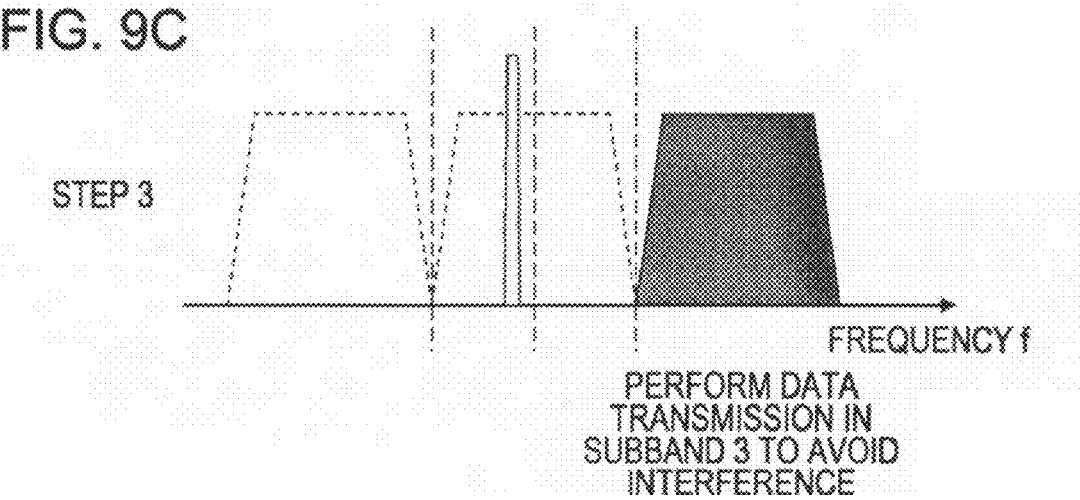

FIGS. 9A to 9C schematically show a communication operation of subband avoidance. When the communication apparatus is performing data transmission using the subband #2 in the band group A, the presence of a narrow-band signal used by a different communication system is detected in the subband #2. In response to the detection result, the subband #3 is newly selected as a transmission channel. Accordingly, by changing the transmission channel, interference with the narrow-band communication system can be avoided.

Figure 10A:
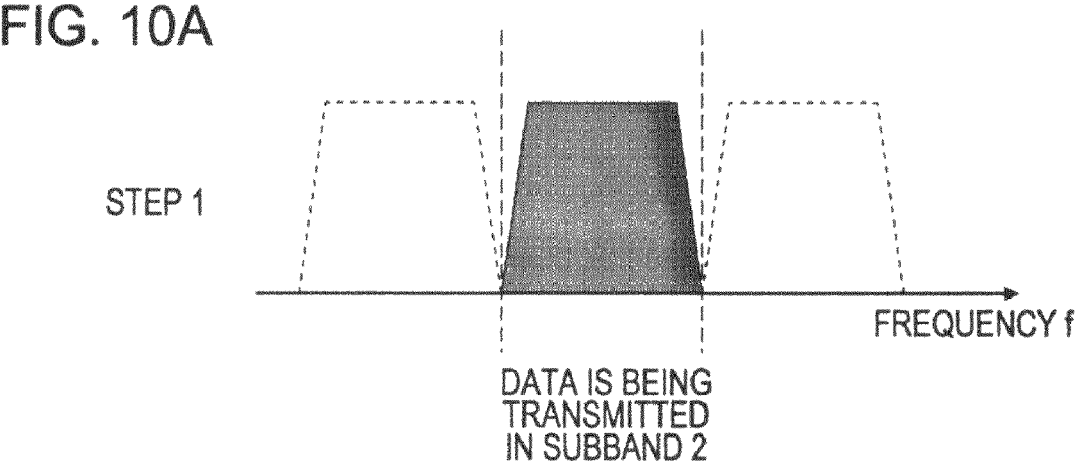
FIGS. 10A to 10C schematically show a communication operation of subcarrier avoidance.
Figure 10B:
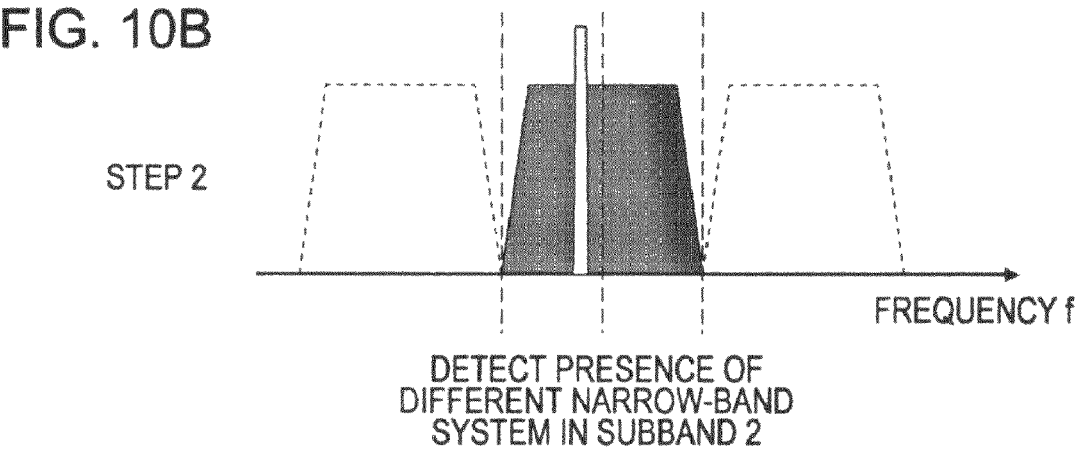
Figure 10C:
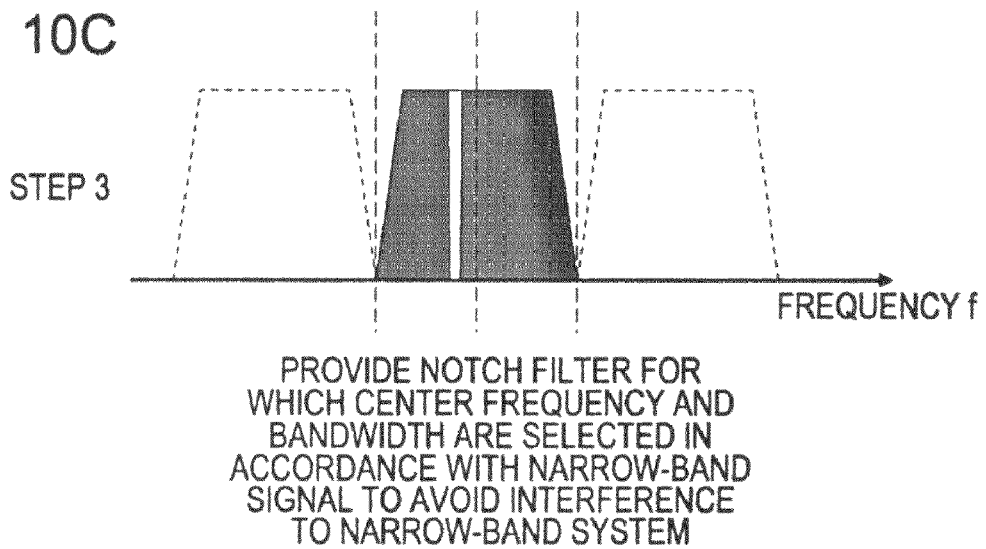
Figure 14:
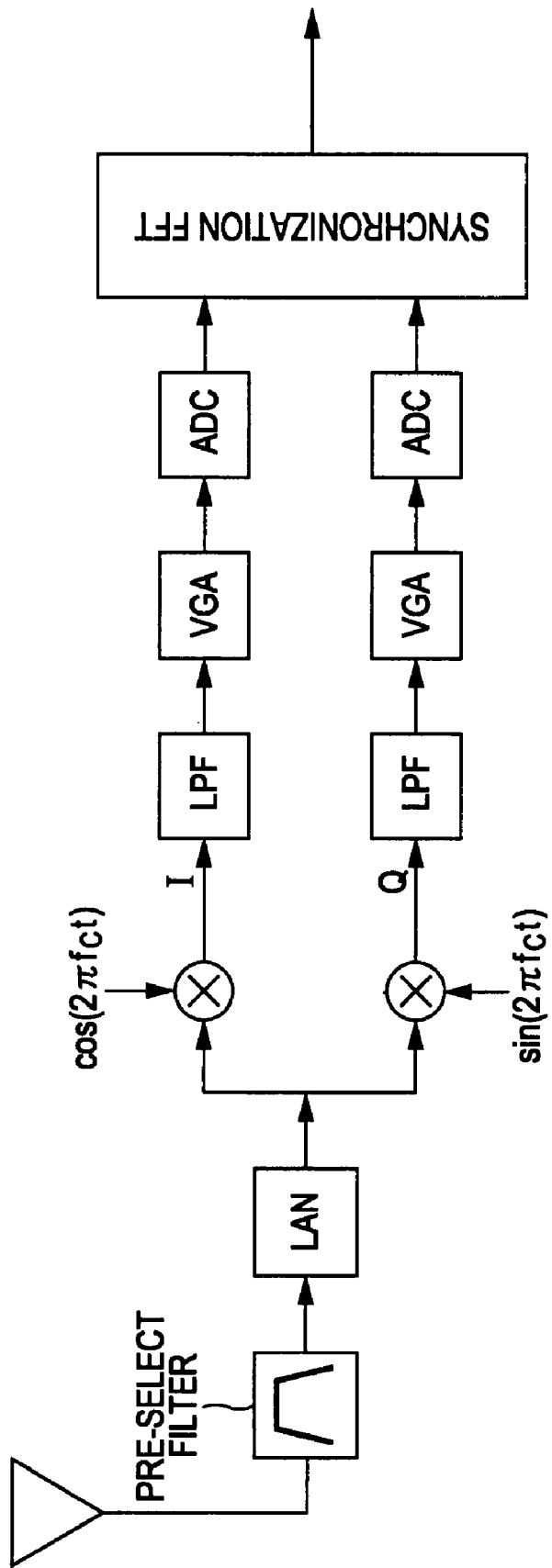
FIG. 14 shows an example of a configuration of a receiver used in the MB-OFDM system.
Figure 15:
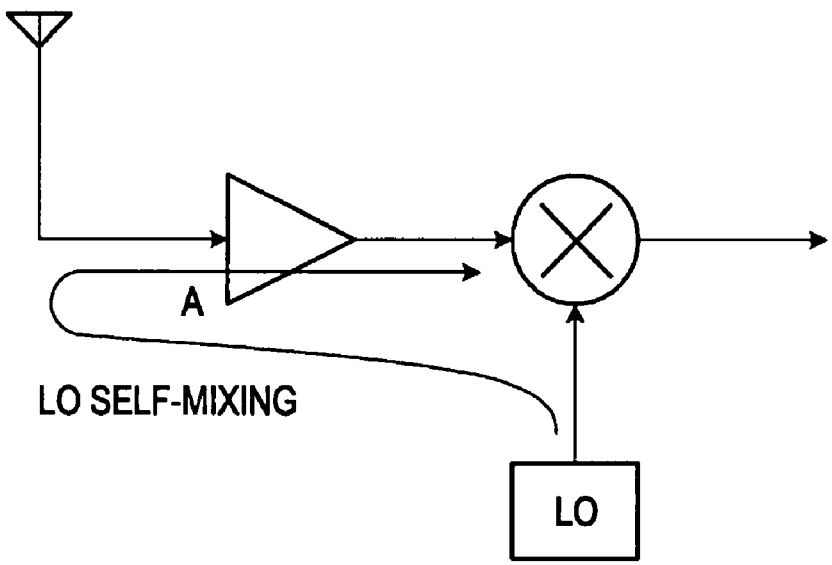
FIG. 15 shows a state in which self-mixing of a local signal is generated in a receiver utilizing the Zero-IF method.
Figure 16:
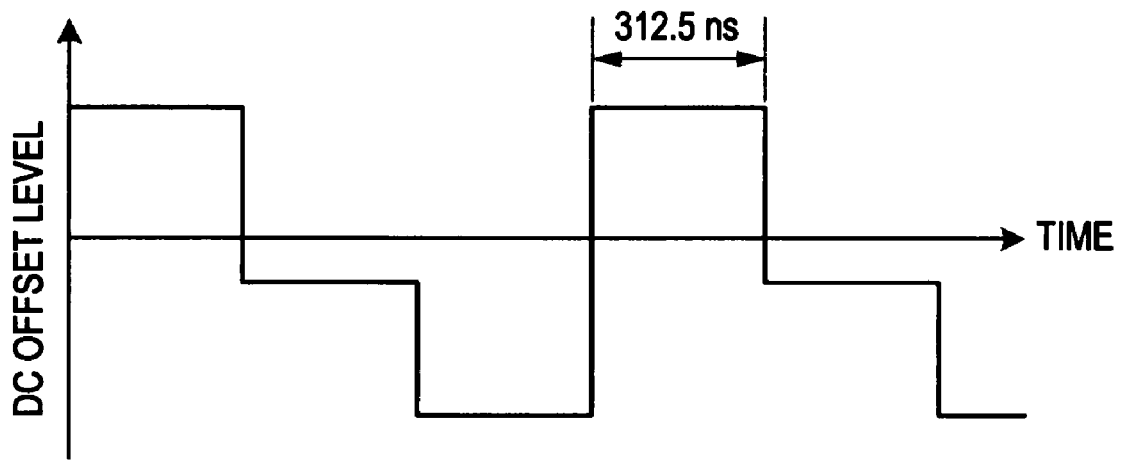
FIG. 16 is an illustration for explaining a DC offset generated by self-mixing.
Figure 17:
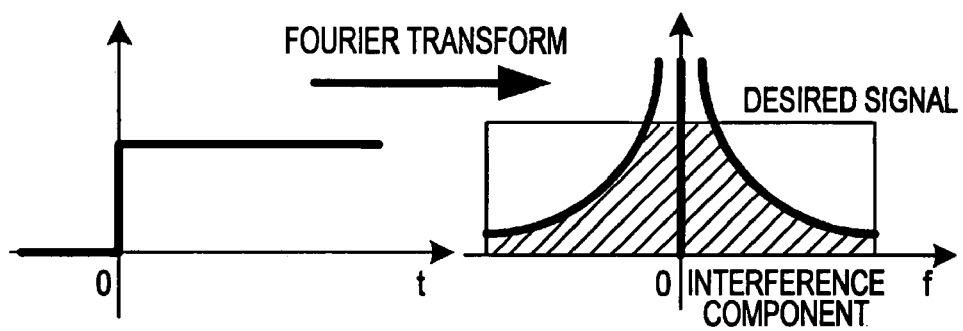
FIG. 17 shows a state in which interference to a baseband desired signal is generated by self-mixing.
Figure 18:
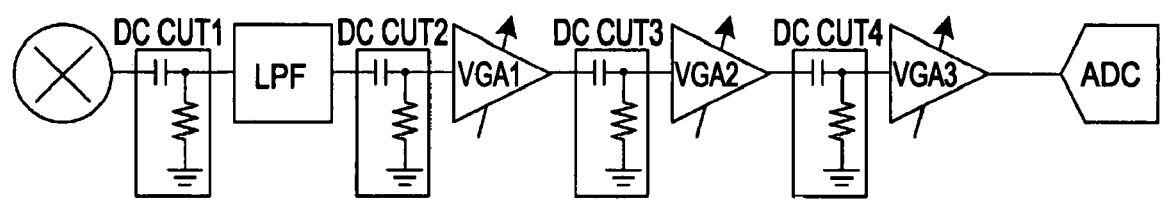
FIG. 18 shows an example of a circuit configuration in which capacitors are inserted in series with each other between stages of mixer outputs in order to remove a DC offset.
Figure 19C:
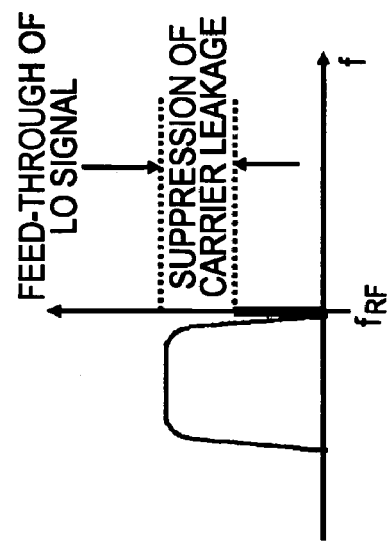
FIGS. 19A to 19C are illustrations for explaining generation of a carrier leakage in an MOD output.
Figure 19B:
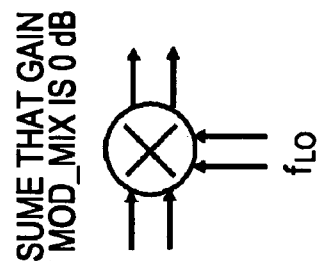
Figure 19A:
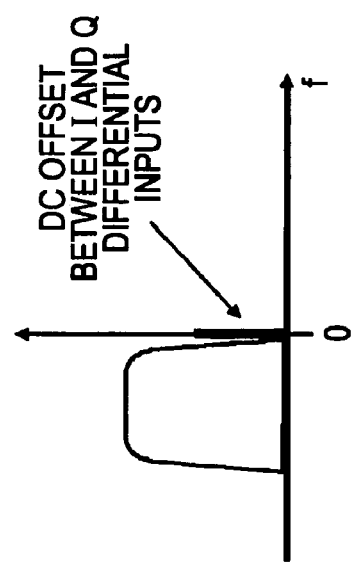
Figure 20:
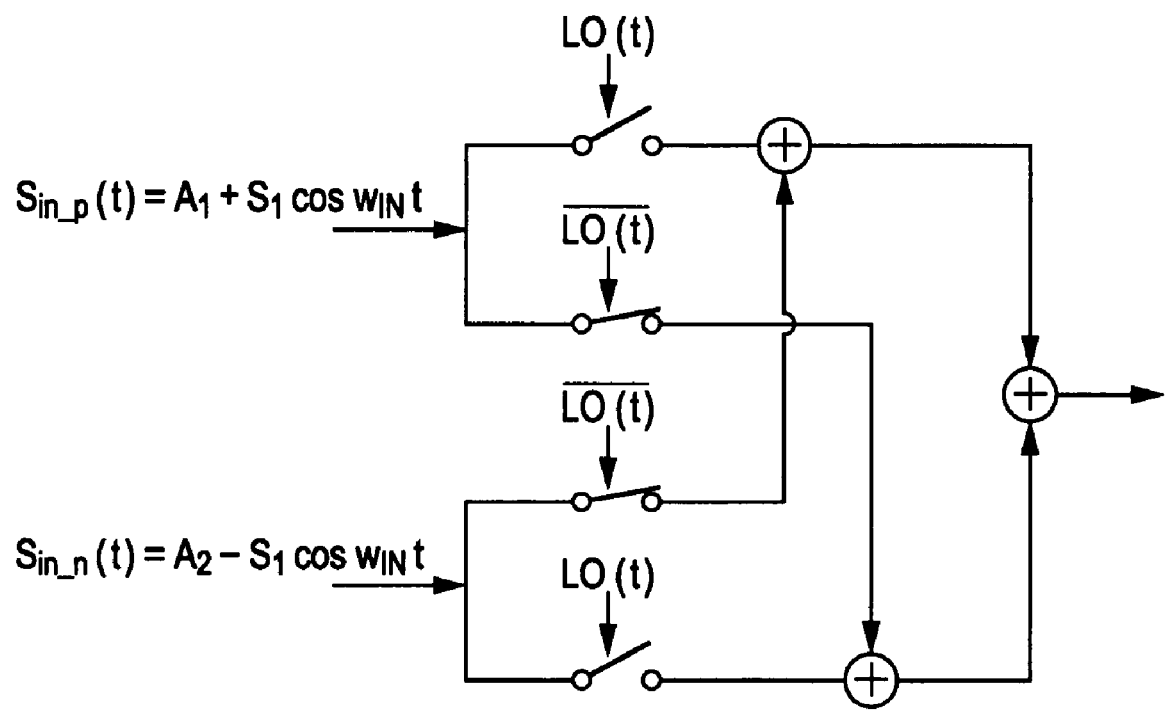
FIG. 20 is an illustration for explaining generation of a carrier leakage in an MOD output.
Figure 21A:
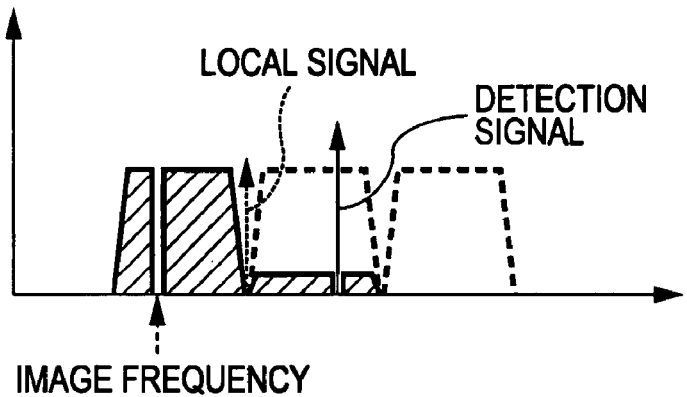
FIGS. 21A to 21C show states in which an image spurious component is generated due to IQ imbalance when orthogonal modulation is performed in the transmitter having the Low-IF configuration.
Figure 21B:
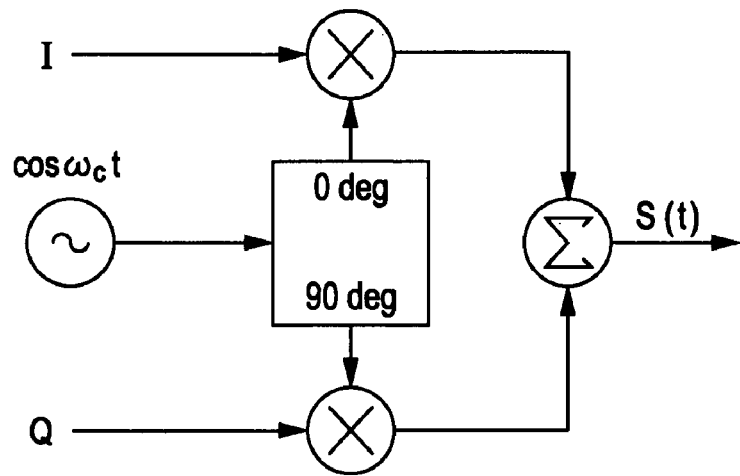
Figure 21C:
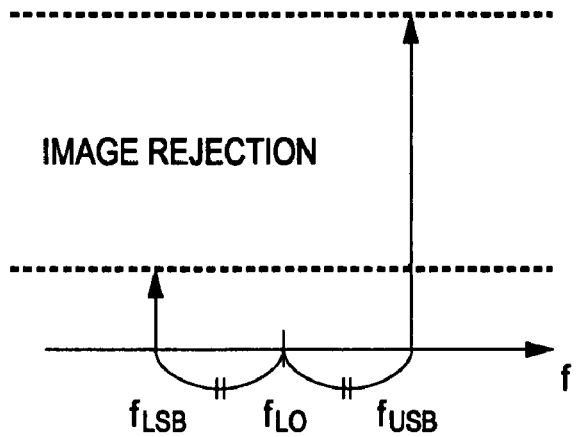

FIGS. 10A to 10C schematically show a communication operation of subcarrier avoidance. When the communication apparatus is performing data transmission using the subband #2 in the band group A, the presence of a narrow-band signal used by a different communication system is detected in the subband #2. In response to the detection result, a notch filter is set so as to fit the center frequency and the bandwidth of the detected narrow-band signal. Accordingly, the transmitter is capable of transmitting a UWB signal formed by a subband in which the notch is inserted so as to avoid interference with the narrow-band communication system.

For example, if the UWB receiver detects the presence of a different system that is performing communication in a frequency band not in the vicinity of a local signal of the UWB receiver, the UWB transmitter performs subband avoidance or subcarrier avoidance. If the UWB receiver detects the presence of a different system that is performing communication in a frequency band in the vicinity of the local signal of the UWB receiver, the UWB transmitter performs subband avoidance.

In general, unification of architectures of a transmitter and a receiver is basic to the design of communication apparatuses. For example, when a transmitter and a receiver have the same architecture, which is one of the Zero-IF configuration and the Low-IF configuration, a circuit configuration can be simplified. However, in the wireless communication apparatus according to this embodiment, the receiver has the Low-IF configuration and the transmitter has the Zero-IF configuration, as shown in FIG. 1. As described above, a major feature of this embodiment is that different architectures are adopted in the transmitter and the receiver. An advantage of such an apparatus configuration will be described below.

Due to the HPF inserted in order to remove a DC offset component generated in a down-converter output, the receiver generates a band region in which frequency information is not obtained. If the communication apparatus adopts the Zero-IF method, such a dead band region is located in the vicinity of a local frequency of the receiver. Thus, it is difficult to perform detection processing of the DAA operation. In contrast, if the receiver adopts the Low-IF method, an interference component with respect to a desired signal is located in a band region obtained by adding an IF of 264 MHz to the local frequency, that is, near an end of a subband. Thus, no dead band region is generated within the subband.

Figure 2:
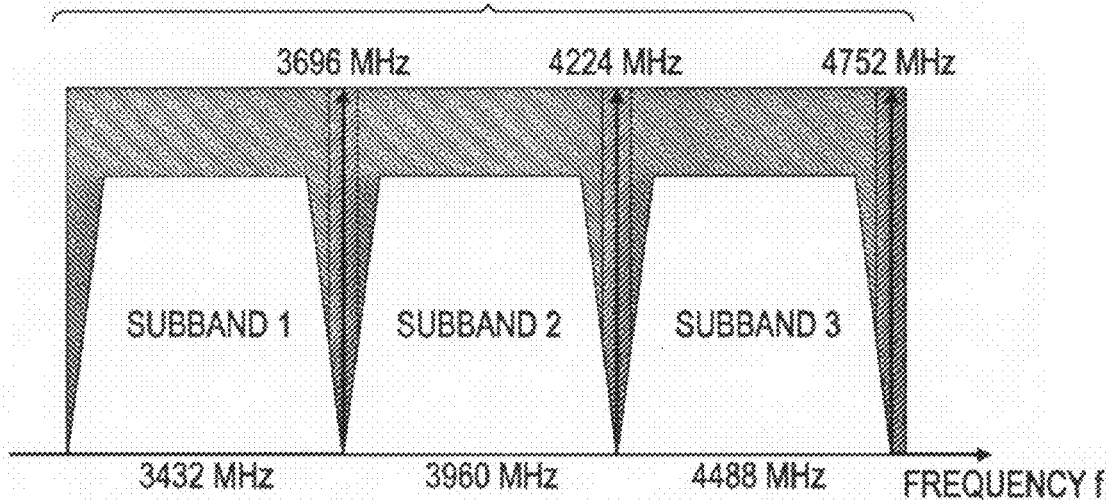
FIG. 2 shows band regions in which a signal of a different system is detectable and band regions in which a signal of a different system is not detectable in a group A shown in FIG. 11 when a receiver adopts a Low-IF method.

FIG. 2 shows band regions in which a signal of a different system is detectable and band regions in which a signal of a different system is not detectable due to the HPF in the group A shown in FIG. 11 when the receiver adopts the Low-IF method. The band regions in which a signal of a different system can be detected are represented by upper-left to lower-right diagonal lines. The band regions in which signal detection is not available are represented by upper-right to lower-left diagonal lines.

When the Low-IF method is employed in the MB-OFDM communication system as in this embodiment, since an IF of 264 MHz, which is half the hopping frequency, is used, dead band regions are disposed in the vicinity of boundaries between subbands, as shown in FIG. 2. However, since, in general, Low-IF means Near Zero-IF, that is, a reduced IF, the IF is not necessarily limited to half the bandwidth. For example, in a communication system using only a single band in which frequency hopping is not performed, when an IF of equal to or more than half the bandwidth is set, a dead band region is disposed outside the used band. Thus, detection processing of the DAA operation can be attained.

In contrast, as the transmitter architecture, the Zero-IF configuration is adopted, unlike the receiver architecture. In this case, since the receiver is capable of detecting the presence of a different system in each subband (see FIG. 2), if an output signal level can be reduced to −70 dBm/MHz or less in each band region in the vicinity of a boundary between subbands serving as a dead band region (see FIG. 3), DAA technology, which is proposed by the Ministry of Internal Affairs and Communications, can be satisfactorily used. In addition, in the case of the transmitter architecture based on the Low-IF method, there is a problem of an image spurious component generated by IQ imbalance when orthogonal modulation is performed, as described above. However, with the Zero-IF configuration, an image spurious component is not generated. Thus, two types of interference avoidance technology, subband avoidance and subcarrier avoidance, are not necessary at the same time. Therefore, a burden regarding the adoption of countermeasures for DAA in the baseband unit is decreased.

As described above, it is very difficult to reduce a leakage carrier to −70 dBm/MHz or less with the MOD_MIX. Thus, when the receiver detects a signal from a different system in a band region in the vicinity of a local signal of the transmitter, 3432 MHz, 3960 MHz, or 4488 MHz, avoidance to another band region utilizing subband avoidance technology should be performed. In general, since it is very rare that different systems exist in all band regions in the vicinity of 3432 MHz, 3960 MHz, and 4488 MHz, it is hardly necessary to stop communication.

Figure 3:
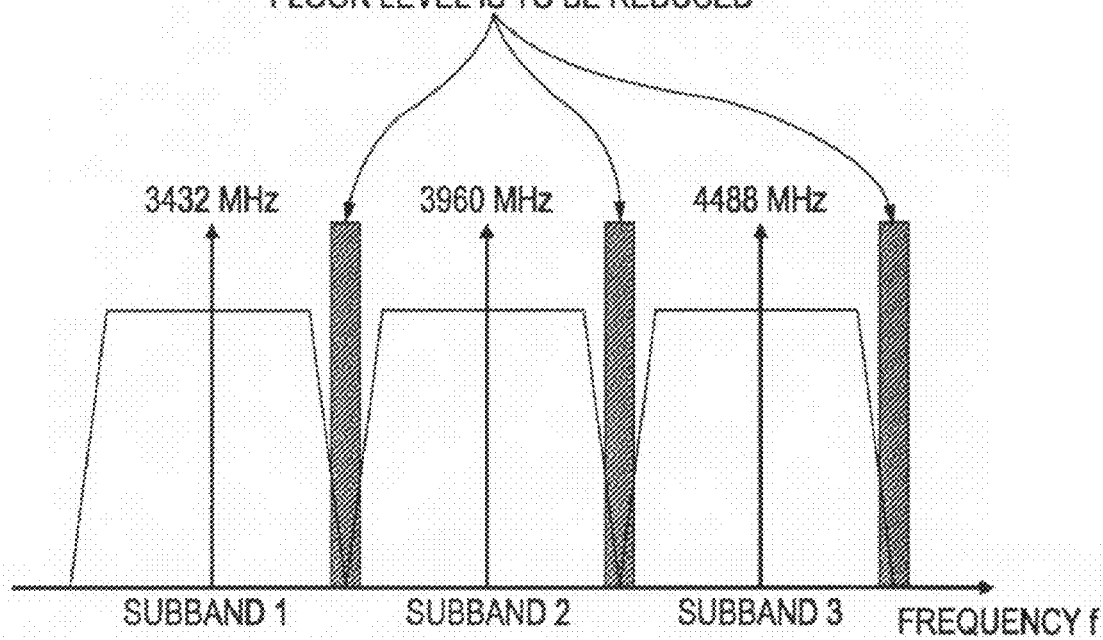
FIG. 3 shows band regions in which the noise floor level should be reduced in a UWB transmitter.

Now, it will be considered whether an output signal level can be reduced to −70 dBm/MHz or less in each band region in the vicinity of boundaries of subbands in the transmitter having the Zero-IF configuration, as shown in FIG. 3.

If the resolution of the D/A converter in the transmitter is 6 bits, a ratio S/Nq representing the ratio of signal to quantization noise is represented by equation (6).

$$S/Nq = 6.02 \times N[\text{bit}] + 1.76 + 10\log OSR - Peakfactor \quad (6)$$

$$= 6.02 \times 6[\text{bit}] + 1.76 + 10\log OSR - Peakfactor = 33.88 \text{ [dB]}$$

In equation (6), a portion "6.02×N[bit]+1.76" is an expression derived when a sinusoidal signal is sampled at a full-scale voltage in a D/A converter having a resolution of N bits. However, actually, by performing over sampling, the spectral density of quantization noise is reduced. This corresponds to a portion "OSR". Since the peak factor of an MB-OFDM signal is about 7 dB, it is necessary to consider the full-scale voltage of the D/A converter on the basis of 7 dB.

As described above, the ratio S/Nq representing the ratio of signal to quantization noise is calculated by using equation (6). If the maximum transmission level is −41.3 [dBm/MHz], the noise floor level at the antenna terminal can be reduced to −75.18 dBm/MHz (=−41.3 [dBm/MHz]−33.88 [dB]) on calculation. However, when the D/A converter is actually mounted in an IC chip, 6 bits is not achieved. It is expected that about 5.5 dB is achieved as realistic effective bits. Even in this case, the noise floor level at the antenna terminal is −72.17 dBm/MHz, which satisfies the specifications of DAA defined by the Ministry of Internal Affairs and Communications.

In addition, it is necessary to consider a problem of a spurious component generated within a band group.

For example, when the band group A shown in FIG. 12 are used, three frequencies, 3432 MHz, 3960 MHz, and 4488 MHz, which are the same as the center frequencies of RF signals are used as local signals. In general, multiplication of the same oscillation frequency by a phase lock loop (PLL) is performed for frequency switching. However, since the switching width of a channel is large in the case of UWB system communication, frequency switching is not achieved in such a wide band using a single PLL. Although a plurality of oscillators can constitute a high-accuracy multiband generator, problems in the size of a circuit, power consumption, and a phase difference in frequencies of oscillators occur. Thus, a method for performing multiband generation by repeatedly performing frequency division of a single frequency output from an oscillator and by mixing the frequency-divided outputs is adopted.

Figure 4:
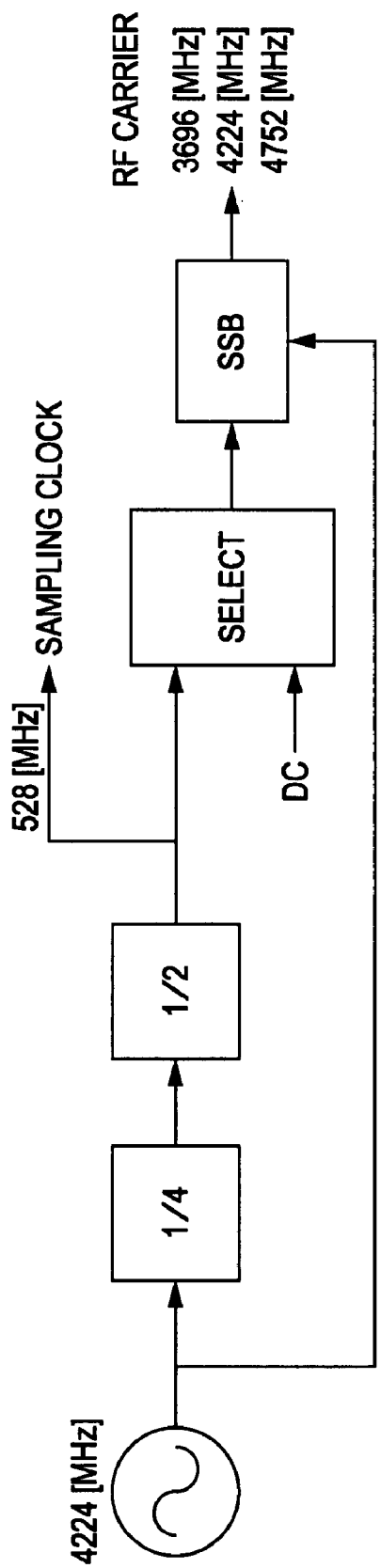
FIG. 4 shows blocks for combining frequencies for frequency hopping in the receiver adopting the Low-If method.
Figure 5:
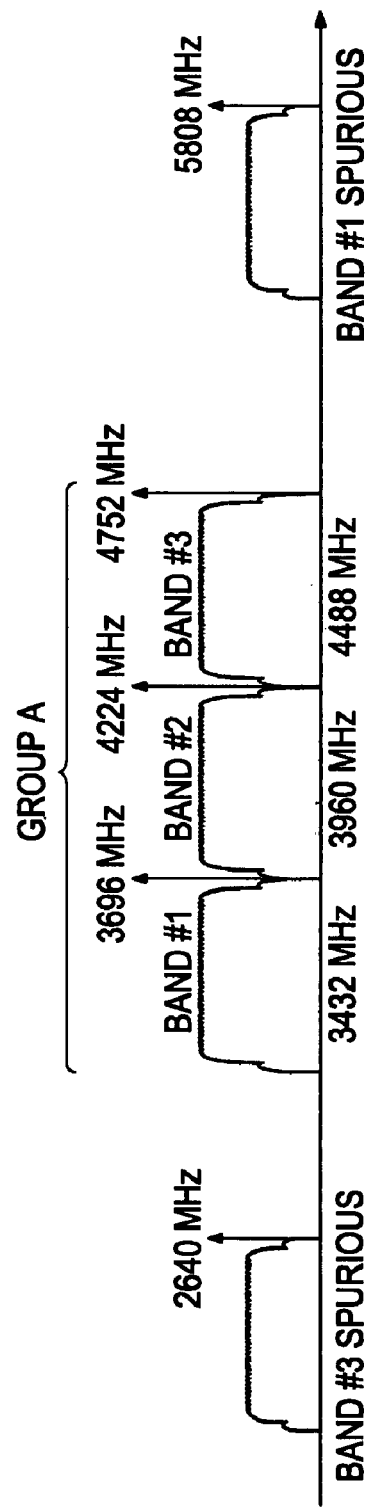
FIG. 5 shows spurious components caused by a harmonic wave of 528 MHz in the blocks for combining frequencies shown in FIG. 4.

In the receiver that adopts the Low-IF method, local signals of the group A shown in FIG. 12 exhibit a frequency 264 MHz higher than the center frequencies of corresponding subbands. FIG. 4 shows an example of a configuration of blocks for combining frequencies for frequency hopping for the above-mentioned frequency configuration. As shown in FIG. 4, a reference frequency obtained from a single oscillator (for example, a temperature-compensated crystal oscillator (TCXO)) is divided and center frequencies are combined using a mixer. In this case, spurious components caused by a harmonic wave of 528 MHz appear at 2640 MHz and 5808 MHz (see FIG. 5). However, since such spurious components appear outside the band regions of the group A, the spurious components can be easily removed using the RF bandpass filter.

Figure 6:
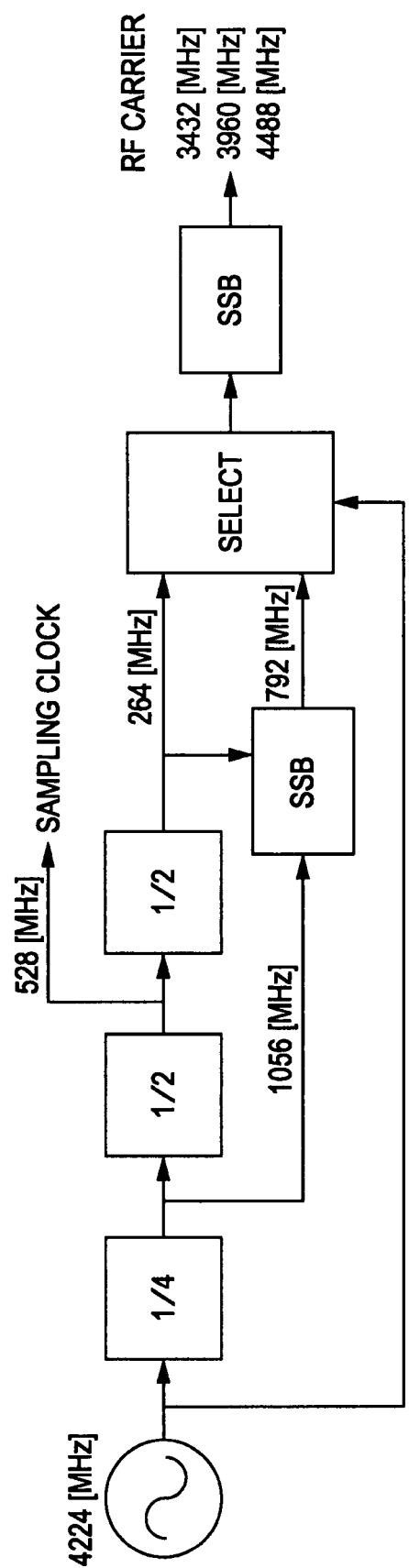
FIG. 6 shows an example of a configuration of blocks for combining frequencies for frequency hopping used in a Zero-IF method (a case of a three-band mode of the group A)

If the transmitter has the Low-IF configuration (Upper LO), which is the same as the configuration of the receiver, a spurious component caused by a harmonic wave of 528 MHz appears outside the frequency band of a band group, as described above. Thus, such a spurious component can be easily removed using the RF bandpass filter. However, when the transmitter adopts the Zero-IF method, blocks for combining frequencies for frequency hopping are configured as shown in FIG. 6 (see, for example, Anuj Batra, "03267r1P802-15_TG3a-Multi-band-OFDM-CFP-Presentation.ppt", pp. 17, July 2003). In the example shown in FIG. 6, a frequency of 4224 MHz obtained by multiplication of an oscillation frequency output from a single oscillator by a PLL is used as a reference frequency. First, a frequency of 1056 MHz is extracted by ¼ frequency division. Then, a frequency of 528 MHz is extracted by ½ frequency division and is used for a sampling clock. By further ½ frequency division, a frequency of 264 MHz, which is the bandwidth of a center frequency in frequency hopping, is extracted from the frequency of 528 MHz.

Mixers described as single side band (SSB) perform frequency addition or subtraction, that is, mixing, on frequency signals obtained as described above. In this case, by performing frequency addition of 528 MHz and 264 MHz, a frequency of 794 MHz is obtained. Then, a selector (Select) selects 264 MHz or 794 MHz. A mixer (SSB) in the downstream performs frequency addition or subtraction of one of the selected frequency signal of 264 MHz or frequency signal of 794 MHz and the original frequency signal of 4224 MHz. Thus, four types of frequencies can be obtained. However, in the group A, only three types of frequencies, 3432 MHz, 3960 MHz, and 4488 MHz, are used.

In this case, since it is necessary to use 264 MHz, if a third harmonic wave or a fifth harmonic wave occurs, a spurious component appears within the frequency band of the corresponding band group. For example, −792 MHz, which is the third harmonic wave of 264 MHz, as well as 528 MHz and 264 MHz are input to the former SSB for generating 792 MHz, and −264 MHz as well as 792 MHz, which is a desired frequency, is generated as outputs. This causes generation of a spurious component within the frequency band of the band group A. Thus, a spurious component of at most about −10 dBc is generated by the third harmonic wave within the band group A.

In order to solve the above-mentioned problems of generation of a spurious component, a digital sine wave is used for the 264 MHz signal. The basic principle of this procedure is described, for example, in Jeffrey A. Weldon, R Sekhar Narayanaswami et al. "A 1.75-GH Highly Integrated Narrow-Band CMOS Transmitter With Harmonic-Rejection Mixers".

Figure 7:
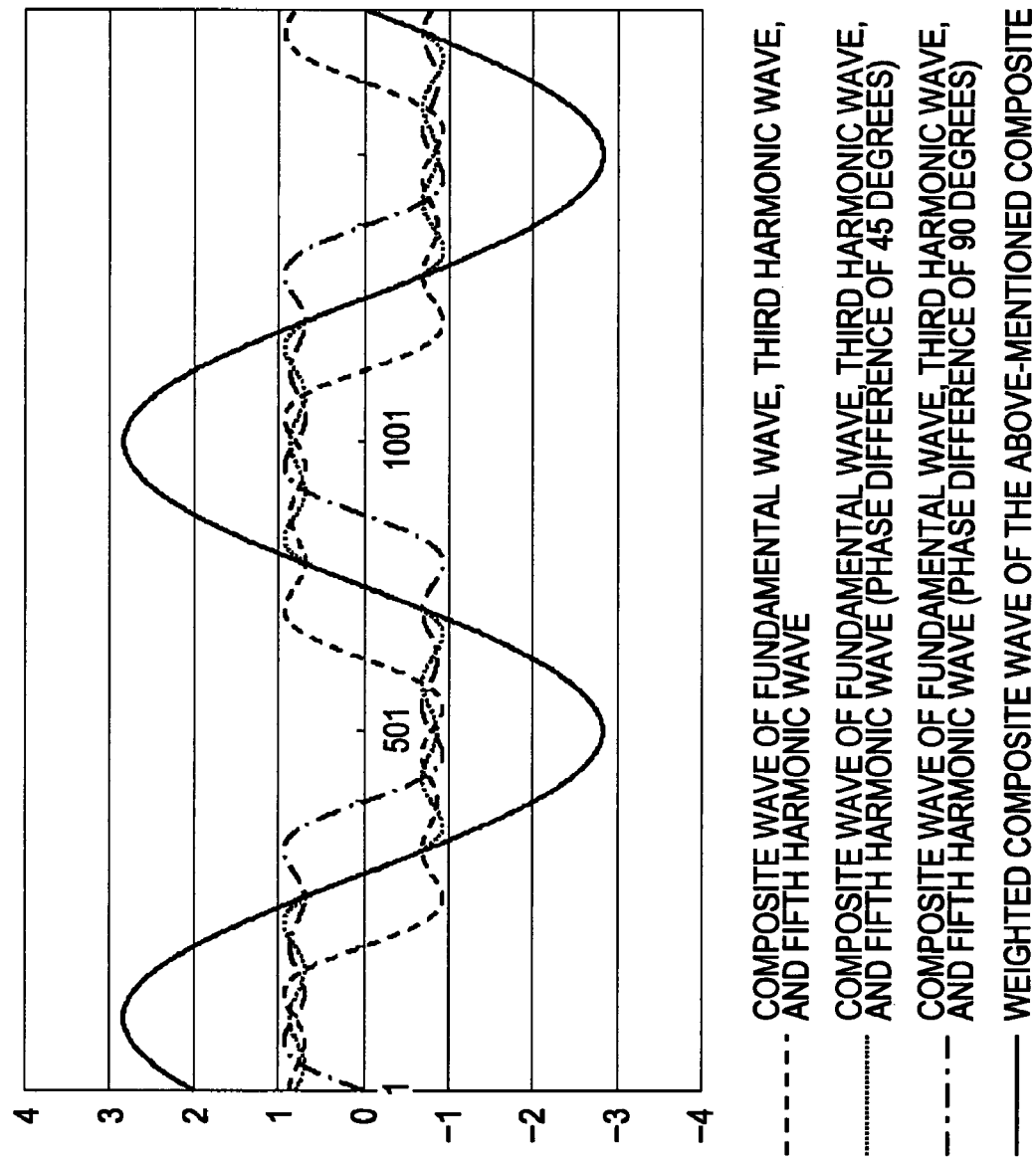
FIG. 7 shows a result in which a composite wave obtained by combining a fundamental wave, a third harmonic wave, and a fifth harmonic wave is shifted by 45 degrees and by 90 degrees, and weighting is assigned to the composite waves at a ratio of 1:√2:1 when a digital sine wave is used for a Low-IF signal.
Figure 8A:
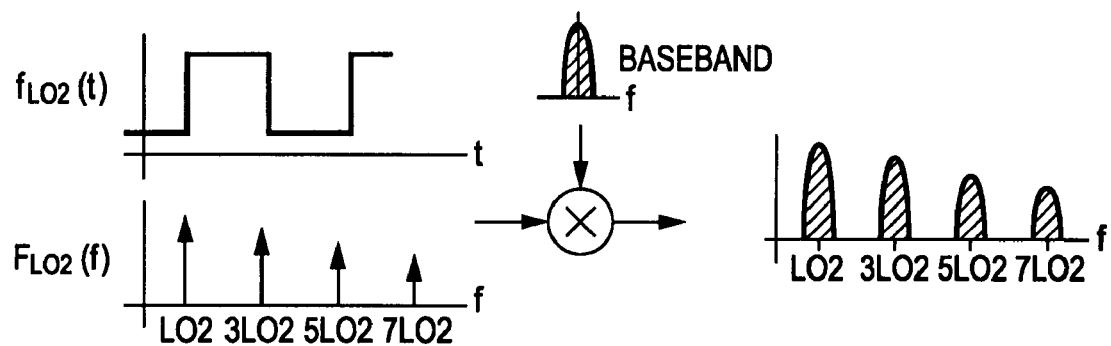
FIGS. 8A and 8B show images of output spectra of the transmitter having the Zero-IF configuration using a digital sine wave.
Figure 8B:
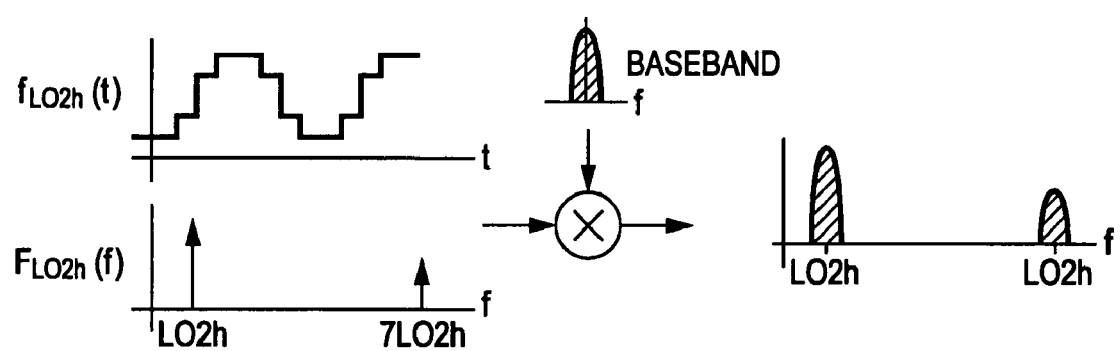

FIG. 7 shows a result in which a composite wave obtained by combining a fundamental wave, a third harmonic wave, and a fifth harmonic wave is shifted by 45 degrees and by 90 degrees, and weighting is assigned to the composite waves at a ratio of 1:√2:1. As described in Jeffrey A. Weldon, R Sekhar Narayanaswami et al. "A 1.75-GH Highly Integrated Narrow-Band CMOS Transmitter With Harmonic-Rejection Mixers", the third harmonic wave and the fifth harmonic wave are canceled out, and only the fundamental wave component is extracted. In addition, FIGS. 8A and 8B show images of output spectra of the transmitter having the Zero-IF configuration using such a digital sine wave. As described above, since the digital sine wave is used for 264 MHz, a spurious component is prevented from being generated within the frequency band of a band group.

Since the configuration of blocks for combining frequencies for generating a local signal is different between reception and transmission, it is necessary to consider how long it takes to perform switching of a local signal generation method. The Phy specifications of the MultiBand OFDM Alliance (MBOA) defines that 10 microseconds (that is, 32 symbols) is used for short interframe spacing (SIFS) and 1.875 microseconds (that is, 6 symbols) is used for minimum interframe spacing (MIFS). In contrast, since frequency hopping is performed for each symbol in the MB-OFDM, band frequency switch time (BST) is defined. Since a very short period of time, 9.47 nanoseconds, is necessary, switching of the local signal generation method can be satisfactorily performed in 1.875 microseconds, which is defined for MIFS. (As one of methods for providing an order of superiority in which a communication station acquires a transmission right, the inter-frame spacing (IFS) to the start of packet transmission includes SIFS, MIFS, and the like. However, this point does not directly relate to the gist of the present invention, the explanation of such a method will be omitted.)

As described above, since a transceiver has a configuration using a UWB wireless system according to an embodiment of the present invention, DAA serving as a mandatory function defined by the Ministry of Internal Affairs and Communications can be realized.

It should be understood by those skilled in the art that various modifications, combinations, sub-combinations and alterations may occur depending on design requirements and other factors insofar as they are within the scope of the appended claims or the equivalents thereof.

What is claimed is:

1. A multiband orthogonal frequency division multiplexing wireless communication apparatus that performs multiband communication in which frequency hopping is performed for orthogonal frequency division multiplexing symbols using a plurality of subbands obtained by dividing a frequency band, the wireless communication apparatus comprising:

a receiver that sets a dead band region in the vicinity of a boundary between the plurality of subbands and that receives incoming signals on which the frequency hopping is performed, the receiver comprising an interference detector that detects interference with an outside communication system in a frequency band region of the outside communication system, the interference being detected after the orthogonal frequency division multiplexing demodulation is performed; and a transmitter that reduces the noise floor in the dead band region to a predetermined level or less and that transmits outgoing signals, the transmitter comprising an interference avoidance unit that transmits the outgoing signals while avoiding the interference in the frequency band region detected by the interference detector, and configured to implement a zero-intermediate frequency method in which frequency conversion is performed using a local signal having a frequency based on a carrier frequency of the outgoing signals and digital transmission signals are converted into the outgoing signals with a signal-to-noise ratio of less than or equal to a predetermined value.

2. The wireless communication apparatus according to claim 1, wherein the receiver is configured to implement intermediate frequency method in which frequency conversion is performed on the incoming signals using a local signal obtained by adding a low intermediate frequency to a center frequency of the receiver, the low intermediate frequency corresponding to half the bandwidth of each of the plurality of subbands.

3. The wireless communication apparatus according to claim 1, wherein the receiver and transmitter implement ultra-wideband communication.

4. The wireless communication apparatus according to claim 1, wherein the interference avoidance unit avoids using subcarriers or subbands corresponding to the frequency band region of the outside communication system.

5. The wireless communication apparatus according to claim 1, wherein the interference avoidance unit avoids using a subband corresponding to the frequency band region of the outside communication system.

6. The wireless communication apparatus according to claim 1, further comprising a bandpass filter for restricting frequencies other than frequency regions of the plurality of subbands, the bandpass filter being arranged upstream of an antenna terminal used to receive the incoming signals or transmit the outgoing signals.

7. The wireless communication apparatus according to claim 1, wherein the receiver is configured to implement an intermediate frequency method by adding a low intermediate frequency to a center frequency of the receiver, and the transmitter is configured to implement a zero-intermediate frequency method using a local signal having a frequency based on a carrier frequency of the outgoing signals.

8. A multiband orthogonal frequency division multiplexing wireless communication apparatus that performs multiband communication in which frequency hopping is performed for orthogonal frequency division multiplexing symbols using a plurality of subbands obtained by dividing a frequency band, the wireless communication apparatus comprising:

a receiver that sets a dead band region in the vicinity of a boundary between the plurality of subbands and that receives incoming signals on which the frequency hopping is performed, the receiver comprising an interference detector that detects interference with an outside communication system in a frequency band region of the outside communication system, the interference being detected after the orthogonal frequency division multiplexing demodulation is performed;

a transmitter that reduces the noise floor in the dead band region to a predetermined level or less and that transmits outgoing signals, the transmitter comprising an interference avoidance unit that transmits the outgoing signals while avoiding the interference in the frequency band region detected by the interference detector; and a multiband generator that generates a local signal for transmission for each of the plurality of subbands by repeatedly performing frequency division on a single frequency output from an oscillator to generate frequency-divided outputs from the single frequency input and by mixing the frequency-divided outputs, wherein the multiband generator uses a digital sine wave having a value corresponding to half the bandwidth of each of the plurality of subbands when the local signal for transmission is generated.

9. A method for multiband orthogonal frequency division multiplexing using multiband communication in which frequency hopping is performed for orthogonal frequency division multiplexing symbols using a plurality of subbands obtained by dividing a frequency band, the method comprising:

detecting interference with an outside communication system in a frequency band region of the outside communication system, the interference being detected after the orthogonal frequency division multiplexing demodulation is performed;

receiving incoming signals on which the frequency hopping is performed;

setting a dead band region in the vicinity of a boundary between the plurality of subbands;

transmitting outgoing signals while avoiding the interference in the detected frequency band region by reducing the noise floor in the dead band region to a predetermined level or less;

frequency converting the outgoing signals using a zero-intermediate frequency method in which the frequency conversion is performed using a local signal having a frequency based on a carrier frequency of the outgoing signals; and converting digital transmission signals into the outgoing signals with a signal-to-noise ratio of less than or equal to a predetermined value.

10. The method according to claim 9, further comprising:

frequency converting the incoming signals using an intermediate frequency method in which the frequency conversion is performed using a local signal obtained by adding a low intermediate frequency to a center frequency used for the receiving, the low intermediate frequency corresponding to half the bandwidth of each of the plurality of subbands.

11. The method according to claim 9, wherein the receiving and transmitting are implemented using ultra-wideband communication.

12. The method according to claim 9, wherein the transmitting avoids using subcarriers or subbands corresponding to the frequency band region of the outside communication system.

13. The method according to claim 9, wherein the transmitting avoids using a subband corresponding to the frequency band region of the outside communication system.

14. The method according to claim 9, further comprising restricting frequencies other than frequency regions of the plurality of subbands using a bandpass filter, the bandpass filter being arranged upstream of an antenna terminal used to receive the incoming signals or transmit the outgoing signals.

15. The method according to claim 9, wherein:

the receiving implements an intermediate frequency method by adding a low intermediate frequency to a center frequency of the receiver, and the transmitting implements a zero-intermediate frequency method using a local signal having a frequency based on a carrier frequency of the outgoing signals.

16. A method for multiband orthogonal frequency division multiplexing using multiband communication in which frequency hopping is performed for orthogonal frequency division multiplexing symbols using a plurality of subbands obtained by dividing a frequency band, the method comprising:

detecting interference with an outside communication system in a frequency band region of the outside communication system, the interference being detected after the orthogonal frequency division multiplexing demodulation is performed;

receiving incoming signals on which the frequency hopping is performed;

setting a dead band region in the vicinity of a boundary between the plurality of subbands;

transmitting outgoing signals while avoiding the interference in the detected frequency band region by reducing the noise floor in the dead band region to a predetermined level or less; and generating a local signal for transmission for each of the plurality of subbands by repeatedly performing frequency division on a single frequency output from an oscillator to generate frequency-divided outputs from the single frequency input and by mixing the frequency-divided outputs, wherein the local signal is generated using a digital sine wave having a value corresponding to half the bandwidth of each of the plurality of subbands when the local signal for transmission is generated.

\* \* \* \* \*